(12) United States Patent
Hasebe et al.

(10) Patent No.: US 7,496,848 B2
(45) Date of Patent: Feb. 24, 2009

(54) IMAGE FORMING APPARATUS AND IMAGE FORMING SYSTEM

(75) Inventors: Takashi Hasebe, Hachioji (JP); Takashi Tamura, Hachioji (JP); Saburo Shimizu, Hachioji (JP); Tetsu Sekine, Hachioji (JP); Shuta Hamada, Hachioji (JP); Utami Soma, Hachioji (JP)

(73) Assignee: Konica Corporation (JP)

( * ) Notice: Subject to any disclaimer, the term of this patent is extended or adjusted under 35 U.S.C. 154(b) by 990 days.

(21) Appl. No.: 10/620,163

(22) Filed: Jul. 14, 2003

(65) Prior Publication Data

US 2004/0012636 A1 Jan. 22, 2004

(30) Foreign Application Priority Data

| Jul. 22, 2002 | (JP) | ............... | 2002-212327 |
| Aug. 8, 2002 | (JP) | ............... | 2002-231098 |
| Aug. 13, 2002 | (JP) | ............... | 2002-235606 |

(51) Int. Cl.
*G06F 3/00* (2006.01)
*G06F 3/14* (2006.01)

(52) U.S. Cl. .................. 715/741; 715/742; 715/864

(58) Field of Classification Search ............... 715/500, 715/209, 864, 737, 741, 742, 744, 747, 771; 705/1, 14, 18, 26, 40, 44, 76
See application file for complete search history.

(56) References Cited

U.S. PATENT DOCUMENTS

2004/0003342 A1* 1/2004 Keane et al. ............... 715/500

FOREIGN PATENT DOCUMENTS

| JP | 2000-76542 A | 3/2000 |
| JP | 2000-322645 A | 11/2000 |
| JP | 2002-27191 | 1/2002 |
| JP | 2002-111929 | 4/2002 |
| JP | 2002-133303 | 5/2002 |
| JP | 2002-169859 | 6/2002 |
| JP | 2002-202870 | 7/2002 |
| JP | 2002-132476 A | 10/2002 |

OTHER PUBLICATIONS

Translation of Noitification of Reason for Refusal for Patent Application No. 2002-235606 mailed on Sep. 11, 2007.

(Continued)

*Primary Examiner*—Weilun Lo
*Assistant Examiner*—Truc T Chuong
(74) *Attorney, Agent, or Firm*—Cantor Colburn LLP

(57) ABSTRACT

An image forming apparatus providing services for general users, capable of getting rid of trouble to collect use charges. The image forming apparatus has: a connector to which a portable communication terminal is connected; a communication section for controlling the portable communication terminal connected to the connector, and controlling communication with the portable communication terminal and a management apparatus; a reading section for reading authentication information out of the portable communication terminal; an inquiry request section for sending the authentication information to the management apparatus, and requesting the management apparatus to inquire the electronic prepaid information based on the authentication information; a receiving section for receiving the electronic prepaid information replied by the management apparatus through the communication section; and an image forming control section for controlling whether to perform image forming processing or not on the basis of the electronic prepaid information.

24 Claims, 28 Drawing Sheets

OTHER PUBLICATIONS

Translation of Notification of Reason for Refusal for Patent Application No. 2002-235606 mailed Dec. 4, 2007.

Japanese Decision of Refusal for Japanese Patent Application No. 2002-212327 mailed Jun. 10, 2008 with English Translation.

Notifications of Reasons for Refusal of Japanese Application No. 2002-231098 dated Dec. 24, 2006.

Notification of Reason for Refusal for Patent Application No. 2002-212327 mailed Mar. 18, 2008 (with English translation).

* cited by examiner

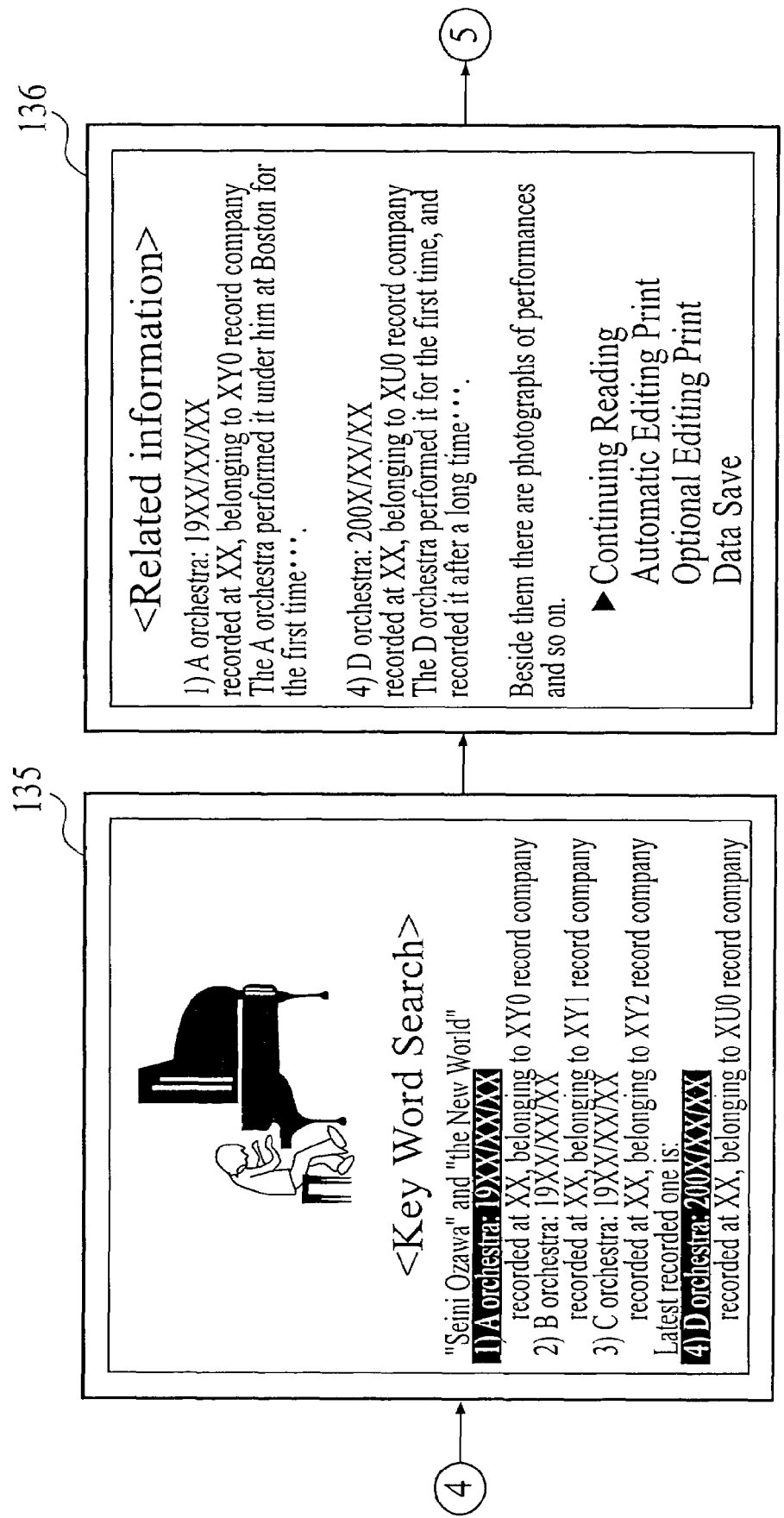

[REGISTERED USER TABLE]

| USER NAME | ELECTRONIC MAIL ADDRESS | ADDRESS | RECEIVING DESIRED DATE | RECEIVING DESIRED ARTICLE |
|---|---|---|---|---|
| USER "A" | ..... | ..... | THE 30TH EVERY MONTH | ..... |
|  |  |  |  |  |
| ∫ | ∫ | ∫ | ∫ | ∫ |

FIG.11

[RECEIVING DESIRED ARTICLE]

| | ARTICLE TITLE | MAGAZINE NAME | PUBLICATION DATE | PUBLISHING COMPANY |
|---|---|---|---|---|
| (1) | "SERIAL ARTICLE BY O.A." | MONTHLY MAGAZINE T | THE 10TH EVERY MONTH | PUBLISHING COMPANY A |
| (2) | "SERIAL ARTICLE BY R.T." | T AND R'S TRAVEL DIARY | THE 20TH EVERY MONTH | PUBLISHING COMPANY B |
| (3) | "SERIAL ARTICLE BY S.M." | MONTHLY VISIT TO GOURMET RESTAURANT | THE 25TH EVERY MONTH | PUBLISHING COMPANY C |

FIG.12

[PROVIDED ARTICLE TABLE]   2523

| USER NAME | PROVIDED ARTICLE DATA | ELECTRONIC KEY |
|---|---|---|
| USER "A" |  |  |
|  |  |  |
|  |  |  |
|  | ∫ | ∫ |
| ∫ | ∫ | ∫ |

FIG.13

[IMAGE FORMING APPARATUS TABLE]   2524

| IDENTIFICATION NUMBER OF IMAGE FORMING APPARATUS | DISPOSED PLACE |
|---|---|
|  |  |
|  |  |
|  |  |
| ∫ | ∫ |

[ELECTRONIC PREPAID TICKET MANAGEMENT TABLE]

| PORTABLE TELEPHONE NUMBER | ELECTRONIC PREPAID TICKET | |
|---|---|---|
| | USABLE NUMBER OF SHEETS | ELECTRONIC KEY |
| | | |
| | | |
| ⋮ | ⋮ | ⋮ |

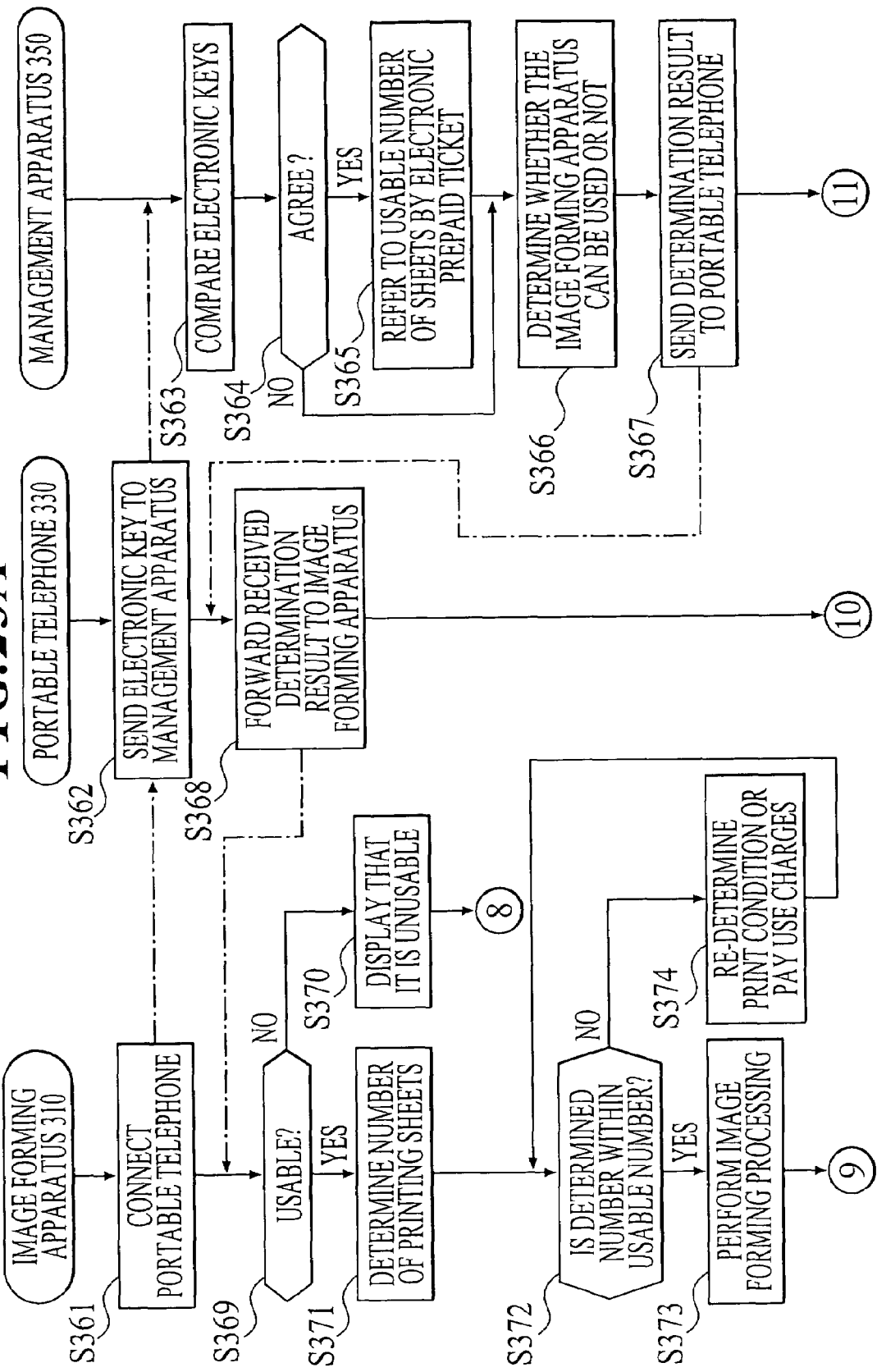

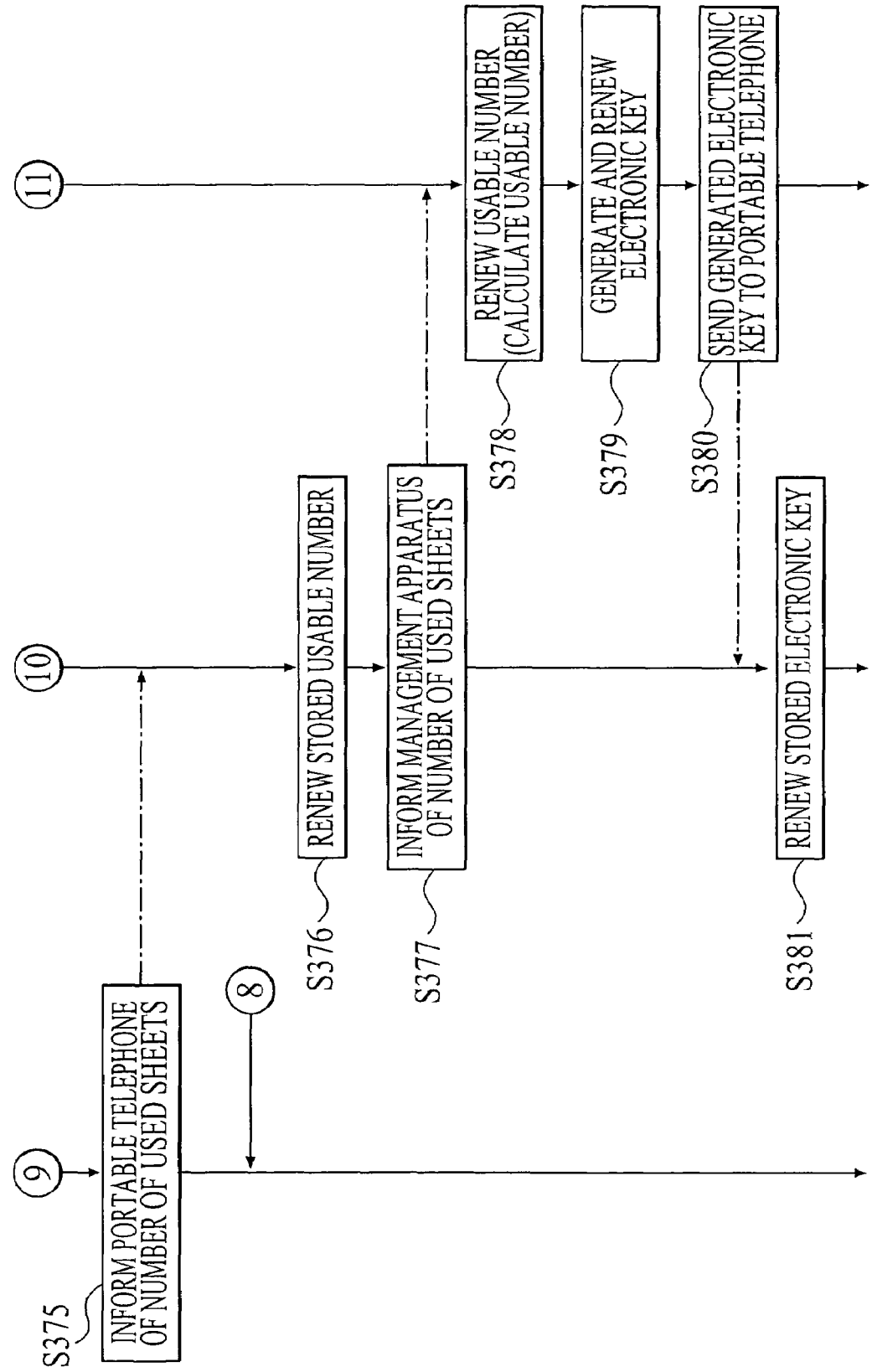

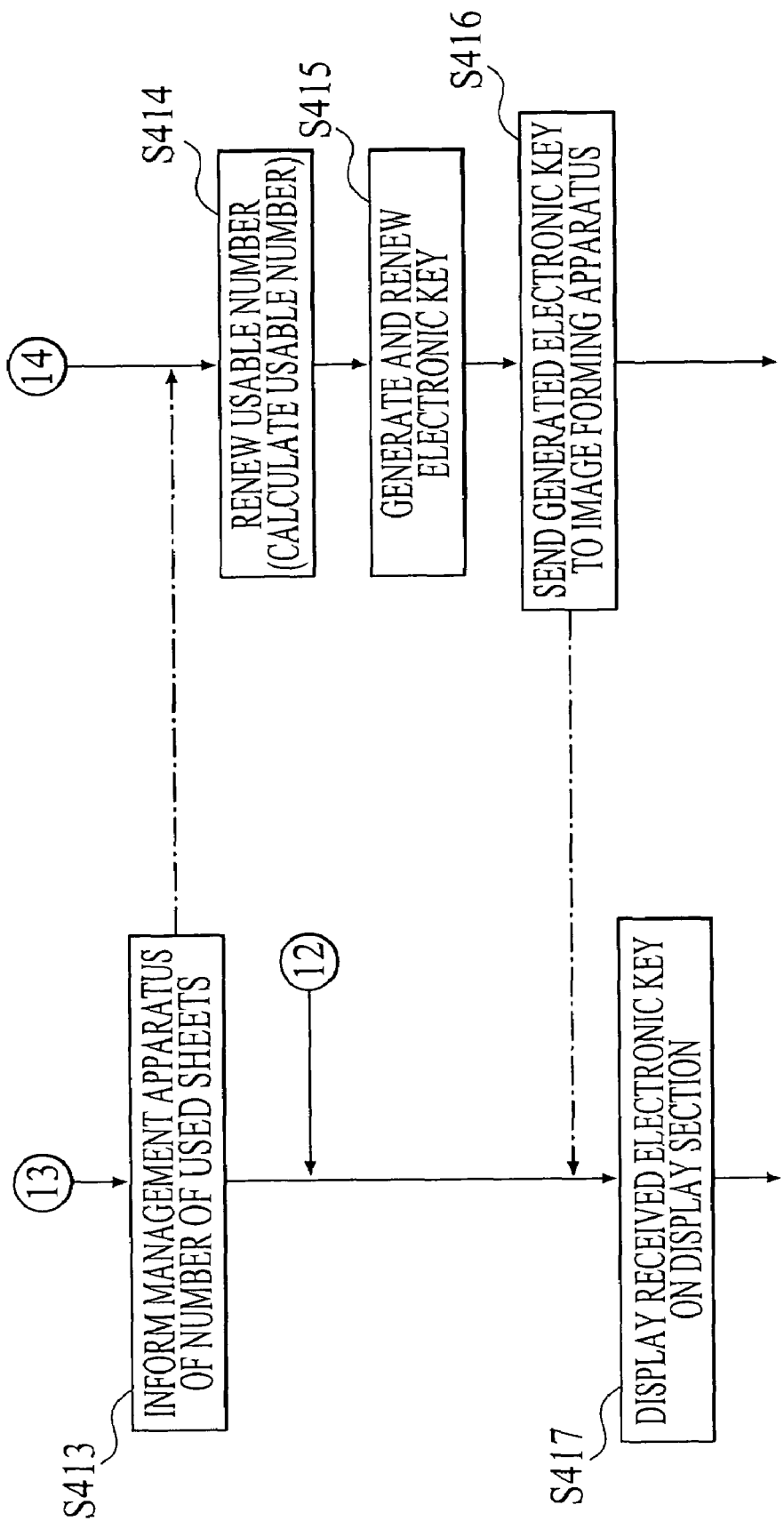

IMAGE FORMING APPARATUS AND IMAGE FORMING SYSTEM

BACKGROUND OF THE INVENTION

1. Field of the Invention

The present invention relates to an image forming apparatus and an image forming system.

2. Description of Related Art

Recently, multimedia terminals for providing various types of services have been developed, and are disposed at shops such as a convenience store or the like, in yards of stations or the like. The multimedia terminal are connected to various types of service provider companies, banks or the like through networks, and provide various types of services such as a shopping service for selling travel tickets or the like, an ATM (automated teller machine) (a machine for automatically depositing and drawing money) service, a game, a fortune-telling or the like.

Some of the multimedia terminals comprise various types of storage media slots such as a compact flush (registered trademark) card slot, a smart media slot or the like, or scanners, and provide services for reading digital image of photographs taken by users or the like out of various types of storage media by the storage media slots, scanning image data of photographs, pictures or the like by the scanners, or printing the image data. When printing the image data, the multimedia terminals can edit the image data and produce calendars, or print the image data with frames.

Further, some of the multimedia terminals prepare connection cables to which communication portable terminals such as a portable telephone or the like are connected, and provide contents for portable telephones which download arrival melodies, waiting screens or the like from the multimedia terminals.

Further, some of the multimedia terminals comprise MD (Mini Disc) slots and provide download services of music data. According to the services, the multimedia terminals connected to record companies through networks, and downloads music data desired by users to MDs. When downloading the music data, the multimedia terminals can display music indexes, artist information, video clips or the like on displays, and make users listen one part of music.

However, because data which users can download according to the download services of music data are limited to the music data, the users can not obtain not only the music data but also related information such as song words, music sheets, artist information or the like. Even if the users can obtain the related information at the same time of downloading the music data, because the music data are distributed from record companies having sales licenses of the music data respectively, the users can not obtain the latest information after the music data are sold as CDs or MDs or detailed related information concerning the music data. Further, because music sheet information is publication information, the users can not obtain it easily with publishing licenses (copyrights of writings) of publishing companies.

In addition, recently, a service called a POD (Print On Demand) or a BOD (Book On Demand) has been popularized. The POD/BOD service is, for example, a publishing service for managing publication data which are electronic data of published articles of magazines, novels or the like as a data base, printing/binding desired copies according to demand for users, and providing the copies for the users.

That is, because the POD/BOD service is a method for printing/binding and providing the copies even when the user demands the POD/BOD service can provide the copies for the user who demands them certainly. Further, because the POD/BOD service is not required to keep a stock of printed/bound products, it is possible to reduce costs caused by inventory management or return operations. In view of above-described advantage, the POD/BOD is proper to provide a small number of copies of publications.

However, the POD/BOD service is usually provided by the publishing company holding the copyright of the publication. That is, the user accepts the BOD service of the publication from the publishing company holding the copyright of the publication, for every publishing company. Therefore, for example, it is impossible to arrange articles published in magazines published from different publishing companies respectively, and obtain one publication.

Usually, in case image forming apparatuses including the above-described multimedia terminals are disposed at shops to provide the above-described services for general users, and profit from the services, the following method has been generalized as a method for collecting use charges. That is, an accounting apparatus comprising a coin insertion slot or a coin container is connected to the image forming apparatus, and permits the user to use the image forming apparatus according to the mount corresponding to coins inserted in the coin insertion slot.

The method for collecting use charges by the accounting apparatus has an advantage that the user can use the image forming apparatus to print only one copy easily. However, the method has a disadvantage that the user is required to prepare coins ever when using the image forming apparatus and has trouble. Further, the provider of the service is required to carry out regular work such as collection of inserted coins, maintenance of the accounting apparatus or the like. Therefore, enterprises owning a plurality of image forming apparatuses have troublesome matters.

In order to get rid of the trouble, a method for collecting use charges on a prepaid card has been popularized. The prepaid card is a magnetic card storing information on usable balance, and the user buys the prepaid card previously. Therefore, when the user uses the image forming apparatus, the image forming apparatus collects use charges by taking the amount corresponding to use of the user off the usable balance of the prepaid card.

Further, for example, concerning the image forming apparatus disposed in an office, a university or the like, a method fro collecting use charges on a user card (user identification card) is adopted to the image forming apparatus. The user card is a magnetic card storing identification information (a name, belonging division or the like) on the user, and the user takes the user card with him. Therefore, when the user uses the image forming apparatus, the image forming apparatus makes a reading apparatus attached thereto read contents stored in the user card, certifies the user and collects use charges in on lump later.

As described above, the methods for collecting use charges on above-described two types of cards can get rid of the trouble. However, because the user is required to take an exclusive card to use the image forming apparatus, the user has trouble with the card.

SUMMARY OF THE INVENTION

The present invention is accomplished in order to solve the above-described problems.

A first object of the present invention is to provide an image forming apparatus and an image forming system capable of obtaining data of information desired by a user and providing the data for the user in an output state desired by the user.

A second object of the present invention is to provide an image forming apparatus and an image forming system capable of providing a publication so as to meet the demand of the user.

A third object of the present invention is to provide an image forming apparatus and an image forming system which provides services for general users, capable of getting rid of trouble to collect use charges.

In accordance with a first aspect of the present invention, an image forming apparatus comprises: a storing section for storing data in a storage medium; an image forming section for forming and printing an image based on data; a connector to which a portable communication terminal is connected; a communication control section for controlling the portable communication terminal connected to the connector, and communicating with a server for managing data of various information on a network; an obtaining section for obtaining desired first data and second data from the server; and a first selecting section for selecting an output state of the first data and the second data obtained by the obtaining section; and wherein the apparatus provides the first data and the second data in the output state selected by the first selecting section.

Preferably, the first data include music data, and the second data include related information data comprising at least one of text data and image data, concerning the music data.

According to the apparatus of the first aspect of the present invention or the above-described apparatus, because the image forming apparatus obtains the first data including music data and the second data including related information data from the server through the portable communication terminal, and selects the output state of the data, it is possible to provide desired data in the desired output state.

Preferably, in the apparatus of the first aspect of the present invention, the first selecting section selects a first output state for storing the first data and the second data in the storage medium, and the storing section stores the first data and the second data in the storage medium.

According to the apparatus, when the first output state is selected, the first data and the second data are stored in the storage medium. Consequently, it is possible provide the data as electronic data.

Preferably, in the apparatus of the first aspect of the present invention, the first selecting section selects a second output state for storing the first data in the storage medium and printing the second data in a predetermined print condition predetermined by the apparatus, the storing section stores the first data in the storage medium, and the image forming section prints the second data in the predetermined print condition predetermined by the apparatus.

According to the apparatus, when the second output state is selected, the first data are stored in the storage medium, and the second data are printed and outputted in the predetermined print condition automatically. Consequently, it is possible to provide desired first data as electronic data and desired second data as high-quality printed matter rapidly.

Preferably, in the apparatus of the first aspect of the present invention, the first selecting section selects a third output state for storing the first data in the storage medium and printing the second data in a desired print condition, the storing section stores the first data in the storage medium, and the image forming section prints the second data in the desired print condition.

According to the apparatus, when the third output state is selected, the first data are stored in the storage medium, and the second data are printed and outputted in the desired print condition automatically. Consequently, it is possible to provide desired first data as electronic data and desired second data as high-quality printed matter printed in the desired print condition, for example, a print condition desired by a user.

Preferably, the above-described apparatus, further comprises a post-processing section for performing post-processing to printed matter obtained by forming and printing the image based on the second data by the image forming section.

According to the apparatus, because the post-processing is performed to the printed matter based on the second data, it is possible to perform biding processing (post-processing) on user's demand and provide fine-finished printed matter.

Preferably, the above-described image forming section comprises a first image forming section and a second image forming section for forming images in different ways, and the above-described apparatus further comprises a second selecting section for selecting any one of the first image forming section and the second image forming section as the image forming section for forming and printing the image based on the second data.

Preferably, the first image forming section forms the image according to at least an inkjet system, and the second image forming section forms the image according to at least an electro-photographic system.

According to the apparatus, because the printed matter is provided by any one or a combination of the first image forming section in the inkjet system and the second image forming section in the electro-photographic system, it is possible to form high-quality images, and provide the most suitable print environment.

Preferably, the apparatus of the first aspect of the present invention, further comprises a third selecting section for selecting any one storage medium from an optical storage medium, a magnetic storage medium, an optical magnetic storage and a semiconductor storage medium as the storage medium in which at least one of the first data and the second data are stored by the storing section.

According to the apparatus, because the storage medium in which the first data or the second data are stored is selected, it is possible to store the data in a desired storage medium, and meet the demand of the user or the like more.

Preferably, the apparatus of the first aspect of the present invention, further comprises a calculating section for calculating a charge for provision of the first data and the second data, wherein the communication control section informs the server of the charge calculated by the calculating section by controlling the portable communication terminal.

According to the apparatus, because the charge is calculated and informed the server, the server can manage the charges collectively. As a result, it is possible to collect the charge easily.

Preferably, in the apparatus of the first aspect of the present invention, the storing section attaches electronic watermark data to at least one of the first data and the second data to be stored in the storage medium, when storing the at least one of the first data and the second data in the storage medium.

According to the apparatus, because the electronic watermark data are attached to the data when the data are stored in the storage medium, it is possible to control the copy of the data and protect the copyright after the data are provided for the user.

In accordance with a second aspect of the present invention, an image forming apparatus comprises: a storing section for storing data in a storage medium; an image forming section for forming and printing an image based on data; a connector to which a portable communication terminal is connected; a communication control section for controlling the portable communication terminal connected to the connector, and communicating with a server for managing data of various information on a network; and an obtaining section for obtaining desired first data and second data from the server; wherein the storing section stores the first data obtained by the obtaining section in the storage medium, and the image forming section prints the second data obtained by the obtaining section in a predetermined print condition predetermined by the apparatus.

According to the apparatus of the second aspect of the present invention, because the first data are stored in the storage medium, and the second data are printed and outputted in the predetermined print condition automatically, it is possible to provide desired first data as electronic data and desired second data as high-quality printed matter for the user or the like rapidly.

In accordance with a third aspect of the present invention, an image forming apparatus comprises: a storing section for storing data in a storage medium; an image forming section for forming and printing an image based on data; a connector to which a portable communication terminal is connected; a communication control section for controlling the portable communication terminal connected to the connector, and communicating with a server for managing data of various information on a network; and an obtaining section for obtaining desired first data and second data from the server; wherein the storing section stores the first data obtained by the obtaining section in the storage medium, and the image forming section prints the second data obtained by the obtaining section in a desired print condition.

According to the apparatus of the third aspect of the present invention, because the first data are stored in the storage medium, and the second data are printed and outputted in the desired print condition automatically, it is possible to provide desired first data as electronic data and desired second data as high-quality printed matter printed in the print condition desired by the user or the like.

In accordance with a fourth aspect of the present invention, in an image forming system comprising a server for managing data of various information on a network, and an image forming apparatus for communicating with the server through a portable communication terminal, the server comprises: a storage for storing data of various information therein; a search section for desired first data and second data requested by the image forming apparatus through the portable communication terminal from the data of various information stored in the storage; and a sending section for sending the first data and the second data searched by the search section to the image forming apparatus through the portable communication terminal, and the image forming apparatus comprises: a storing section for storing data in a storage medium; an image forming section for forming and printing an image based on data; a connector to which the portable communication terminal is connected; a communication control section for controlling the portable communication terminal connected to the connector, and communicating with the server; an obtaining section for obtaining the first data and the second data sent from the server; and a first selecting section for selecting an output state of the first data and the second data obtained by the obtaining section, wherein the apparatus provides the first data and the second data in the output state selected by the first selecting section.

Preferably, the storage of the server stores at least music data and related information data including at least one of text data and image data concerning the music data, the first data include the music data, and the second data include the related information data concerning the music data.

Preferably, in the above-described system, the first selecting section selects a first output state for storing the first data and the second data in the storage medium, and the storing section stores the first data and the second data in the storage medium.

Preferably, in the above-described system, the first selecting section selects a second output state for storing the first data in the storage medium and printing the second data in a predetermined print condition predetermined by the apparatus, the storing section stores the first data in the storage medium, and the image forming section prints the second data in the predetermined print condition predetermined by the image forming apparatus.

Preferably, in the above-described system, the first selecting section selects a third output state for storing the first data in the storage medium and printing the second data in a desired print condition, the storing section stores the first data in the storage medium, and the image forming section prints the second data in the desired print condition.

In accordance with a fifth aspect of the present invention, and image forming apparatus for communicating with a server for storing a plurality of provided article data and accounts related to the plurality of provide article data respectively, through a portable communication terminal, comprises: a connector to which the portable communication terminal is connected; a communication section for controlling the portable communication terminal connected to the connector, and communicating with the server; an input section for inputting an account; a sending request section for requesting the server to send provided article data based on the account inputted by the input section through the communication section; a receiving section for receiving the provide article data requested by the sending request section and sent from the server through the communication section; and an image forming section for forming an image based on the provided article data received by the receiving section.

The image forming apparatus of the fifth aspect of the present invention, can obtain provided article data corresponding to the inputted account from the server, and form the image based on the provided article data. Consequently, when provided article data corresponding to an article desired by the user and the account are related to each other, and the user previously obtains the corresponding account, the user can obtain printed matter of the desired article easily by inputting the obtained account to the image forming apparatus.

Preferably, in the apparatus of the fifth aspect of the present invention, the image forming section comprises a plurality of image forming sections for forming images in different ways, and the apparatus further comprises a selecting section for selecting an image forming section for forming the image based on the provided article data from the plurality of image forming sections according to a rate of full-color photograph data included in the provided article data received by the receiving section.

Preferably, the selecting section selects an image forming section for forming the image according to an inkjet system from the plurality of image forming sections when full-color photograph data are included in the provided article data, and an image forming section for forming the image according to an electro-photographic system from the plurality of image forming sections when full-color photograph data are not included in the provided article data.

The image forming apparatus can select the different image forming system according to the rate of full-color photograph data included in the provided article data, and form the image in the selected image forming system. Consequently, because the apparatus comprises, for example, the inkjet system capable of a printing high-quality photograph and the electro-photographic system capable of printing the image at high speed as the image forming system, the apparatus can form the image in the inkjet system in a first case the full-color photograph data are included in the provided article data and form the image in the electro-photographic system in a second case other than the first case. Consequently, it is possible to provide the printed matter having the full-color photograph quality of high quality and the character quality of high speed and high quality, for the user.

Preferably, in the apparatus of the fifth aspect of the present invention, the account includes at least one of authentication information and identification information of the portable communication terminal.

Preferably, in the apparatus of the fifth aspect of the present invention, the image forming section forms an electronic watermark image when forming the image based on the provided article data.

The image forming apparatus can form the electronic watermark image when forming the image based on the provided article data. Consequently, for example, the apparatus can control the copy of the printed matter generated by forming the image based on the provided article data, and protect the copyright.

Preferably, the apparatus of the fifth aspect of the present invention, further comprises a post-processing section for performing post-processing to printed matter of the image formed by the image forming section.

Preferably, the post-processing section performs at least one of punch processing for punching a binding hole at a predetermined position of the printed matter, stapling processing for stapling the printed matter, trimmer processing for trimming the printed matter in predetermined size, pamphlet preparing processing for preparing a pamphlet, and biding processing for biding the printed matter simply, as the post-processing.

In accordance with a sixth aspect of the present invention, in an image forming system comprising a server and an image forming apparatus for communicating with the server through a portable communication terminal, the server comprises: a first storage for storing a plurality of provided article data and accounts related to the plurality of provide article data respectively therein; and a sending section for sending provided article data corresponding to an account included in sending request information sent from the image forming apparatus through the portable communication terminal to the image forming apparatus, in reply to the sending request information, and the image forming apparatus comprises: a connector to which the portable communication terminal is connected; a communication section for controlling the portable communication terminal connected to the connector, and communicating with the server; an input section for inputting the account; a sending request section for sending the sending request information including the account inputted by the input section to the server through the communication section; a receiving section for receiving the provide article data sent from the server through the communication section; and an image forming section for forming an image based on the provided article data received by the receiving section.

According to the system of the sixth aspect of the present invention, the server can store a plurality of provided article data and accounts related to each other, and send provided article data corresponding to the request of the image forming apparatus. On the other hand, the image forming apparatus can obtain provided article data corresponding to the inputted account from the server, and form the image based on the provided article data. Consequently, for example, when the provided article data corresponding to the article desired by the user and the account are related to each other and the user previously obtains the corresponding account, the user can obtain the printed matter of the desired article easily by inputting the obtained account to the image forming apparatus.

Preferably, in the system of the sixth aspect of the present invention, the image forming section of the image forming apparatus comprises a plurality of image forming sections for forming images in different ways, and the apparatus further comprises a selecting section for selecting an image forming section for forming the image based on the provided article data from the plurality of image forming sections according to a rate of full-color photograph data included in the provided article data received by the receiving section.

According to the system, the image forming apparatus can select the different image forming system according to the rate of full-color photograph data included in the provided article data, and form the image in the selected image forming system. Consequently, because the apparatus comprises, for example, an inkjet system capable of printing high-quality photographs and an electro-photographic system capable of printing images at high speed, as the image forming system, the apparatus can form the image in the inkjet system in a first case the full-color photograph data are included in the provided article data, and form the image in the electro-photographic system in a second case other than the first case. Consequently, it is possible to provide printed matter having the full-color photograph quality as high quality and the character quality as high speed and high quality for the user.

Preferably, in the system of the sixth aspect of the present invention, the server further comprises: a second storage section for classifying and storing a plurality of stored article data in a predetermined classified condition therein; a determination section for determining an extract condition for every account stored in the first storage section; and a storage control section for extracting stored article data satisfying the extract condition determined by the determination section, from the plurality of stored article data stored in the second storage section.

According to the system, when the user specifies the desired article, the server can extract the stored article data corresponding to the desired article for every user and store the provided article data and the account related to each other. Consequently, when the stored article data stored in the first storage are electronic data of articles (publications) which a plurality of publishing companies allows the server to use, the server can provide an original publication on user's demand, without the restriction of the publishing companies.

Preferably, in the above-described system, the first storage section of the server stores an electronic mail address related to each of the accounts therein, and the server further comprises a sending section for reading the electronic mail address corresponding to the account out of the first storage section when the storage control section completes extracting and storing the stored article data based on the account, and sending a predetermined electronic mail to the electronic mail address read.

According to the system, when completing extracting the corresponding stored article data, the server can send the electronic mail, for example, showing the completion of the extract to the electronic mail address corresponding to the account, for every account. Consequently, for example, when the server relates the electronic mail address of the user to the account for every account, the server can inform the user of that the printed matter of the desired article can be provided, by sending the electronic mail. Herein, the server may be a mail server for sending the electronic mail and use the corresponding account as the user ID of the mail server. Further, the server may inform the user by using the electronic mail having the account information as one part of the electronic mail address.

Preferably, in the system of the sixth aspect of the present invention, the account includes at least one of authentication information and identification information of the portable communication terminal.

Preferably, in the system of the sixth aspect of the present invention, the image forming section of the image forming apparatus forms an electronic watermark image when forming the image based on the provided article data.

Preferably, in the system of the sixth aspect of the present invention, the image forming apparatus further comprises a post-processing section for performing post-processing to printed matter of the image formed by the image forming section.

Preferably, the post-processing section performs at least one of punch processing for punching a binding hole at a predetermined position of the printed matter, stapling processing for stapling the printed matter, trimmer processing for trimming the printed matter in predetermined size, pamphlet preparing processing for preparing a pamphlet, and biding processing for biding the printed matter simply, as the post-processing.

In accordance with a seventh aspect of the present invention, an image forming apparatus for communicating with a management apparatus for storing a plurality of electronic prepaid information and authentication information related to the plurality of electronic prepaid information respectively, and replaying to inquiry request for electronic prepaid information based on authentication information through a portable communication terminal storing authentication information, comprises: a connector to which the portable communication terminal is connected; a communication section for controlling the portable communication terminal connected to the connector, and controlling communication with the portable communication terminal and the management apparatus; a reading section for reading authentication information out of the portable communication terminal; an inquiry request section for sending the authentication information read by the reading section to the management apparatus through the communication section, and requesting the management apparatus to inquire the electronic prepaid information based on the authentication information; a receiving section for receiving the electronic prepaid information replied by the management apparatus requested to inquire by the inquiry request section through the communication section; and an image forming control section for controlling whether to perform image forming processing or not on the basis of the electronic prepaid information received by the receiving section.

The image forming apparatus of the seventh aspect of the present invention, can control the image forming processing or not, that is, whether the image forming processing is performable or not, on the basis of the electronic prepaid information corresponding to the authentication information stored in the portable communication terminal connected thereto. That is, the image forming apparatus can perform the image forming processing by using the electronic prepaid information.

That is, the user obtains the authentication information and stores it in the portable communication terminal, for example, by previously paying predetermined charges. Therefore, when the user connects the portable communication terminal to the image forming apparatus to use the image forming apparatus, the user can make the image forming apparatus perform the image forming processing, that is, the user can use the image forming apparatus, according to the paid charges. Consequently, it is unnecessary that the user inserts coins into the image forming apparatus or takes a private card with him or her even when using the image forming apparatus, as usual. As a result, it is possible to get rid of trouble with use of the image forming apparatus.

Preferably, in the apparatus of the seventh aspect of the present invention, the electronic prepaid information include at least balance information, and the image forming control section determines a performable number of the image forming processing on the basis of the balance information and controls the image forming processing.

The image forming apparatus can perform the image forming processing according to the number based on the balance information included in the electronic prepaid information. That is, it is possible to control the performance of the image forming processing so that the performance number of the image forming processing does not exceed the performable number according to the balance included in the electronic prepaid information.

Preferably, the above-described apparatus further comprises: an operation input section for inputting desired performance number of the image forming processing; and an accounting section for accounting in a predetermined system according to an excess number of the desired performance number over the performable number, when the desired performance number inputted by the operation input section exceeds the performable number determined based on the balance information by the image forming control section.

The image forming apparatus can account an excess charge for the excess number when the inputted desired performance number exceeds the performable number. Consequently, in case the user has to make the image forming apparatus perform the image forming processing although the desired performance number exceeds the performable number, the user can use the image forming apparatus according to the desired number without the restriction of the performable number.

Preferably, the above-described apparatus, further comprises a display for displaying at least one of an instruction to pay a shortfall accounted in the predetermined system according to the excess number by the accounting section, and an instruction to input the desired performance number of the image forming processing by the operation input section so as to prevent the shortfall from occurring, when the desired performance number inputted by the operation input section exceeds the performable number determined based on the balance information by the image forming control section.

Preferably, the apparatus of the seventh aspect of the present invention, further comprises a use information sending section for sending use information according to the image forming processing controlled by the image forming control section, to the portable communication terminal.

In accordance with an eighth aspect of the present invention, in an image forming system comprising an image forming apparatus, a management apparatus and a portable communication terminal, the portable communication terminal comprises: an authentication information storage for storing authentication information therein; an authentication information sending section for sending the authentication information stored in the authentication information storage to the image forming apparatus; a first transfer section for transferring electronic prepaid information sent from the management apparatus to the image forming apparatus; and a second transfer section for transferring use information sent from the image forming apparatus to the management apparatus, the management apparatus comprises: an electronic prepaid information storage for storing a plurality of electronic prepaid information and authentication related to the plurality of electronic prepaid information respectively therein; an electronic prepaid information sending section for sending electronic prepaid information corresponding to authentication information sent from the portable communication terminal to the portable communication terminal, in response to inquiry request for the electronic prepaid information based on the authentication information; and a renewing section for renewing the electronic prepaid information stored in the electronic prepaid information storage according to the user information transferred from the portable communication terminal, and the image forming apparatus comprises: a connector to which the portable communication terminal is connected; an image forming control section for controlling whether to perform image forming processing or no on the electronic prepaid information transferred from the portable communication terminal; and a use information sending section for sending use information based on the image forming processing to the portable communication terminal.

According to the system of the eight aspect of the present invention, the image forming apparatus can control the image forming processing, that is, whether to perform the image forming processing, on the basis of the electronic prepaid information corresponding to the authentication stored in the portable communication terminal connected thereto. That is, the image forming apparatus can use the electronic prepaid information and perform the image forming processing.

That is, the user obtains the authentication information and stores it in the portable communication terminal, for example, by previously paying predetermined charges. Therefore, when the user connects the portable communication terminal to the image forming apparatus to use the image forming apparatus, the user can make the image forming apparatus perform the image forming processing, that is, the user can use the image forming apparatus, according to the paid charges. Consequently, it is unnecessary that the user inserts coins into the image forming apparatus or takes a private card with him or her even when using the image forming apparatus, as usual. As a result, it is possible to get rid of trouble with use of the image forming apparatus.

Preferably, in the system of the eighth aspect of the present invention, the electronic prepaid information includes at least balance information, and the image forming control section determines performable number of the image forming processing on the basis of the balance information, and controls the image forming processing.

Preferably, in the above-described system, the image forming section further comprising: an operation input section for inputting desired performance number of the image forming processing; and an accounting section for accounting in a predetermined system according to an excess number of the desired performance number over the performable number, when the desired performance number inputted by the operation input section exceeds the performable number determined based on the balance information by the image forming control section.

Preferably, in the system of the eighth aspect of the present invention, the renewing section of the management apparatus renews the electronic prepaid information stored in the electronic prepaid information storage according to the use information transferred from the portable communication terminal, and renews the authentication information related to the electronic prepaid information renewed, the management apparatus further comprises an authentication information sending section for sending the authentication information renewed by the renewing section to the portable communication terminal, and the portable communication terminal further comprises an authentication information renewing section for renewing the authentication information stored in ten authentication information storage on the basis of the authentication information sent from the management apparatus.

Preferably, in the above-described system, the portable communication terminal further comprises a purchase desired number sending section for sending a purchase desired number of the image forming processing performed by the image forming apparatus, to the image forming apparatus, and the renewing section of the management apparatus renews the electronic prepaid information stored in the electronic prepaid information storage according to the purchase desired number sent from the portable communication terminal, and renews the authentication information related to the electronic prepaid information renewed.

In accordance with a ninth aspect of the present invention, an image forming apparatus for communicating with a management apparatus for storing a plurality of electronic prepaid information and authentication information related to the plurality of electronic prepaid information respectively and replying inquiry request for electronic prepaid information based on authentication information, through a communication line, comprises: an operation section for inputting authentication information; a communication section for communicating with the management apparatus through the communication line connected to the image forming apparatus, when the authentication information is inputted by the operation section; an inquiry request section for sending the authentication information inputted by the operation section to the management apparatus through the communication section, and making the inquiry request for the electronic prepaid information based on the authentication information; a receiving section for receiving the electronic prepaid information replied by the management apparatus in response to the inquiry request made by the inquiry request section through the communication section; and an image forming control section for controlling whether to perform image forming processing on the basis of the electronic prepaid information received by the receiving section.

Preferably, the electronic prepaid information includes at least balance information, and the above-described apparatus further comprises a display for displaying a performable number of the image forming processing on the basis of balance information.

Preferably, the electronic prepaid information includes at least balance information, and the image forming control section determines a performable number of the image forming processing on the basis of balance information, and controls the image forming processing.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIGS. 5A to 5D are transition views of menu screens displayed on the image forming apparatus 110 according to the image providing processing;

FIG. 11 is a table showing an example of a data structure of a receiving desired article included in the registered user table 2522 shown in FIG. 10;

FIG. 12 is a table showing an example of a data structure of a provided article table 2523 of the server 250;

FIG. 13 is a table showing an example of a data structure of an image forming apparatus table 2524 of the server 250;

FIGS. 23A and 23B are flowcharts showing image forming apparatus use processing performed by the image forming apparatus 310, the portable telephone 330 and the management apparatus 350;

FIGS. 25A and 25B are flowchart showing the image forming apparatus use processing performed by the image forming apparatus 310 and the management apparatus 350 according to another embodiment example of the third embodiment.

PREFERRED EMBODIMENTS OF THE INVENTION

First Embodiment

Hereinafter, the first embodiment of the present invention will be explained in detail, with reference to figures.

According to the first embodiment, a CPU 1110 has functions as the obtaining section and the calculating section, an operation section 114 has a function as the storing section, an inkjet-type image forming section 117 has a function as the first image forming section, an electrophotography-type image forming section 118 has a function as the second image forming section, a communication control section 1120 has a function as the communication control section, and a connection section 1120a has a function as the connector, as claimed in claims of the present invention.

First, the structure will be explained as follows.

Figure 1:
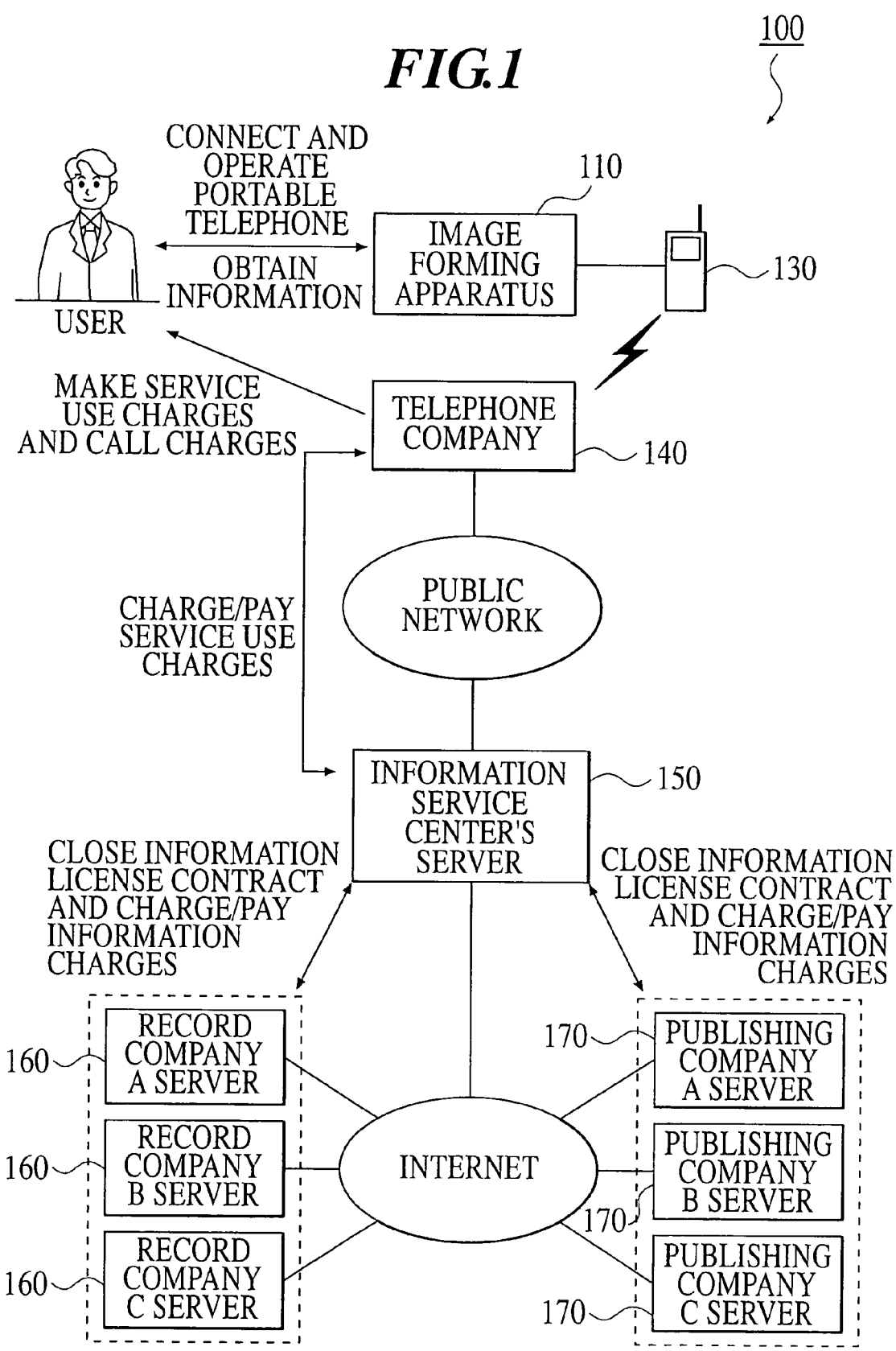
FIG. 1 is a conceptual view showing a whole structure of an information providing service system 100 according to a first embodiment to which the present invention is applied.

FIG. 1 is a conceptual view showing a whole structure of an information providing service system 200 according to the first embodiment.

In the information providing service system 200 shown in FIG. 1, an image forming apparatus 110 is connected to a portable telephone 130 which a user takes with him or her, and is connected to a server 150 of an information service center through a public network so as to exchange data with the server 150 in wireless-communication through the portable telephone 130. The server 150 is connected to servers 160 disposed at record companies A, B and C and servers 170 disposed ad publishing companies A, B and C through Internet.

The image forming apparatus 110 is connected to the portable telephone 130, and is connected to the server 150 of the information service center in wireless-communication through the portable telephone 130. The image forming apparatus 110 obtains various types of data such as music data desired by the user, data (including image data, text data and so on) of related information on the music data or the like from the server 150, stores the data in a storage medium or prints and outputs the data, and provides the storage medium or printing matter for the user.

The portable telephone 130 is a portable communication terminal which the user takes with him or her, and communicates with an external apparatus on the public network through a base station of a telephone company 140 for providing communication services.

The server 150 of the information service center closes license contract with the record companies A, B and C and the publishing companies A, B and C for various types of information such as music data, related information on the music, electronic publication data or the like belonging to the companies. Therefore, the server 150 previously obtains various types of information which the server 150 is permitted to use, from the above-described companies, and stores secondary information edited based on the obtained information. Further, the server 150 can access a site set on the Internet by each of the servers 160 of the record companies A, B and C or each of the servers 170 of the publishing companies A, B and C, and obtain various types of information disclosed on the site. When the server 150 receives a request for various types of information from the image forming apparatus 110, the server 150 searches data of specified information and sends the data to the image forming apparatus 110 through the public network.

Herein, a charge system for the information providing service system 100 shown in FIG. 1 will be explained simply. According to the charge system for the information providing service system 100, the server 150 charges the telephone company 140 of the portable telephone 130 which the user takes with him or her use charges for information providing service use including information charges for various types of information provided from the record company, the publishing company or the like, and printing charges for image formation or post processing of print data performed by the image forming apparatus 110. Then, the telephone company 140 charges the user the use charges besides call charges of the portable telephone 130, and requests the user to pay the charges.

Next, the image forming apparatus 110 according to the present invention will be explained in detailed.

Figure 2:
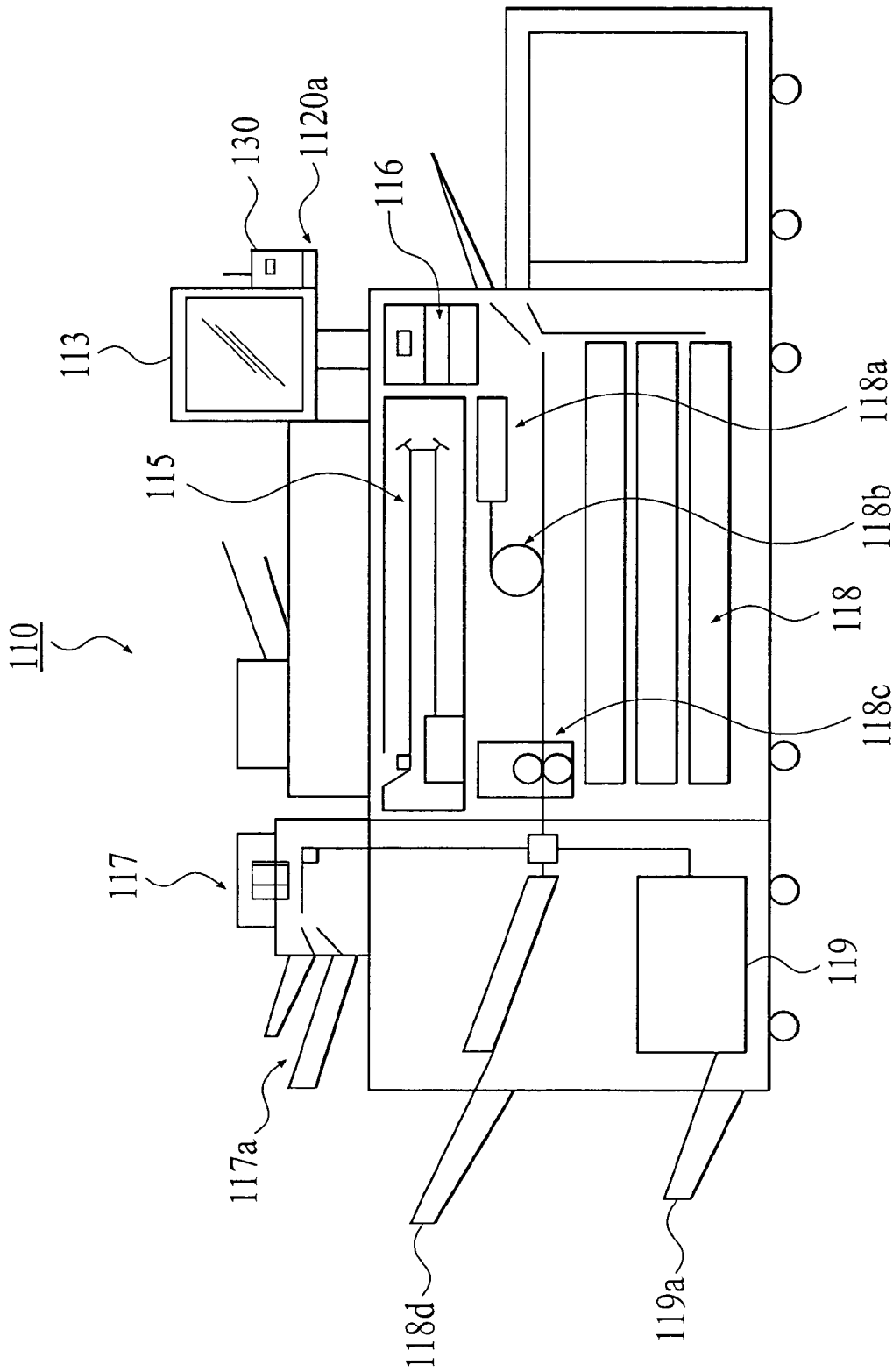
FIG. 2 is an external appearance view of an image forming apparatus 110 of the information providing service system 100 shown in FIG. 1.

FIG. 2 is an external appearance view of the image forming apparatus 110. As shown in FIG. 2, the image forming apparatus 110 comprises a display section 113, a scanner 115 for reading image data, a connection section 1120a for the portable telephone 130 and an inkjet type of image forming section 117 at an upper portion of the apparatus, a reading section 116 for reading out or writing data in various types of storage media such as a MD, a memory card or the like at a front portion of the apparatus, and an electrophotography type of image forming section 118 and a post-processing section 119 for performing post processing for printed matter at an internal portion of the apparatus.

Figure 3:
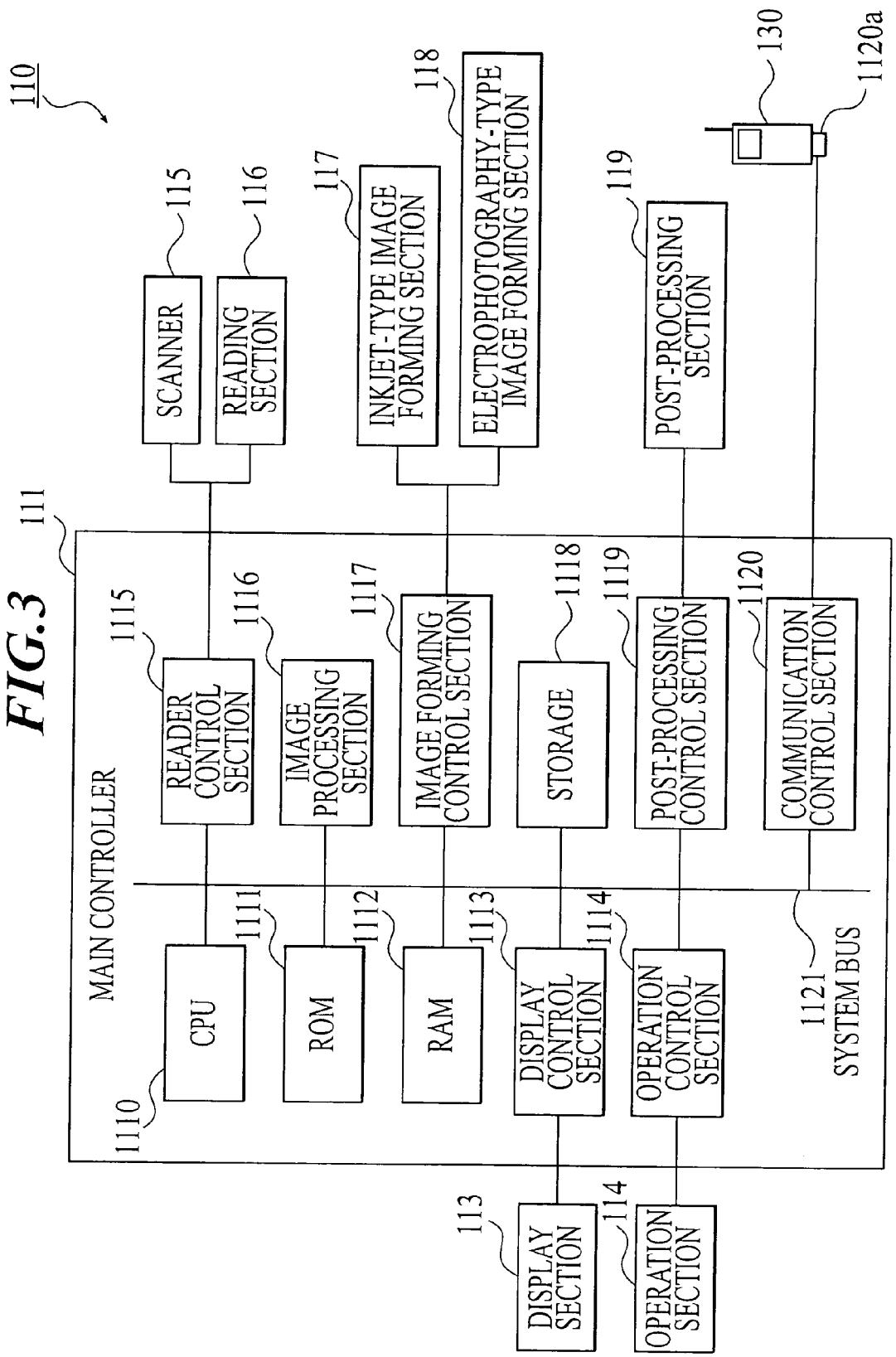
FIG. 3 is a block diagram showing a functional structure of the image forming apparatus 110 shown in FIG. 2.

Then, the functional structure of the image forming apparatus 110 shown in FIG. 2 will be explained with reference to the block diagram shown in FIG. 3. As shown in FIG. 3, the image forming apparatus 110 comprises a main controller 111, the display section 113, an operation section 114, the scanner 115, the reading section 116, the inkjet type image forming section 117, the electrophotography type image forming section 118, the post-processing section 119 and the connection section 1120a.

The main controller 111 comprises a CPU 1110, a ROM 1111, a RAM 1112, a display control section 1113, an operation control section 1114, a reader control section 1115, an image processing section 1116, an image forming control section 1117, a storage 1118, a post-processing control section 1119 and a communication control section 1120 which are connected to each other through a system bus 1121.

The display section 113 is connected to the display control section 1113, the operation section 114 is connected to the operation control section 1114, the scanner 115 and the reading section 116 are connected to the reader control section 1115, the inkjet type image forming section 117 and the electrophotography type image forming section 118 are connected to the image forming control section 1117, the post-processing section 119 is connected to the post-processing control section 1119, and the connection section 1120a is connected to the communication control section 1120.

The CPU 1110 controls each section of the image forming apparatus 110 on the basis of various types of control programs stored in the ROM 1111 in a concentrated way. More specifically, the CPU 1110 reads out programs stored in the ROM 1111 and develops the programs in the RAM 1112 according to signals inputted through the communication control section 1120 or the operation section 114. Then, the CPU 1110 performs various types of processing based on the programs to make each section of the image forming apparatus 110 function. At the time, the CPU 1110 stores results of various types of processing in the RAM 1112, and displays the results on the display section 113 as necessary.

More specifically, the CPU 1110 reads an information providing processing program out of the ROM 1111, and performs the following information providing processing according to the program.

According to the information providing processing, when the user connects the portable telephone 130 to the image forming apparatus 110 and the CPU 1110 receives an operation instruction to apply for the information providing service, the CPU 1110 makes the communication control section 1120 control and communicate with the portable telephone 130, and applies the server 150 of the information service center for the information providing service. Then, when the CPU 1110 receives menu information from the server 150, the CPU 1110 makes the display section 113 display the menu information thereon, makes the user select and instruct on a desired service menu through the operation section 114, and makes the user select and instruct on desired music data and related information.

Then, when the CPU 1110 requests the server 150 to send the music data and the data of related information selected and instructed by the user and obtains them, the CPU 1110 makes the user select a menu for an output state of the obtained data. When the user selects a "data save" menu, the CPU 1110 makes the reading section store the music data and the related information data in a storage medium. When the user selects an "automatic editing print" menu, the CPU 1110 makes the reading section 116 store the music data in the storage medium, and makes the image forming section 117 or 118 print and perform post-processing for the related information data in a print condition and a post-processing condition which is previously determined by the image forming apparatus 110. When the user selects an "optional editing print" menu, the CPU 110 makes the reading section 116 store the music data in the storage medium, and makes the image forming section 117 or 118 print and perform post-processing for the related information data in a print condition and a post-processing condition including a printing layout which is determined according to the operation instruction of the user. When providing the music data and the related information data for the user in the output state selected by the user, the CPU 1110 calculates service charges, displays a message for making the service charges besides call charges of the portable telephone 130 on the display section 113, and makes the communication control section 1120 inform the server 150 of the service charges and a telephone number of the portable telephone 130.

The ROM 1111 is a read-only semiconductor memory, and stores various types of control programs performed by the CPU 1110. For example, the ROM 1111 stores a system program for controlling the whole system, an initialization program, a program for performing the following information providing processing or the like, therein. The ROM 1111 may be a storage medium from which data can be erased and in which data can be written, such as a flash memory or the like. For example, the ROM 1111 may have a structure capable of storing a program or data inputted through the communication control section 1120 from an external, and the CPU 1110 may have a structure capable of performing various types of processing according to the stored program.

The RAM 1112 is a storage medium for storing data temporarily. The RAM 1112 has various types of areas such as an area for developing programs performed by the CPU 1110, an area for temporarily storing data inputted through the reading section 116, the communication control section 1120, the operation section 114 or the like or results of various processing performed by the CPU 1110, an area for temporarily storing image data inputted through the scanner 115, the reading section 116, the communication control section 1120 or the like.

The display control section 1113 displays display data on the display section 113 according to the instruction outputted from the CPU 1110. For example, the display control section 1113 displays display data of various types of menu screens, a jam information screen for indicating a paper-stuffed position, an error screen or the like on the display section 113.

The display section 113 comprises a display screen such as a CRT (Cathode Ray Tube), a LCD (Liquid Crystal Display) or the like, and displays the display data thereon under the control of the display control section 1113.

The operation section 114 comprises numeric keys or function related to various types of functions, and outputs an operation signal corresponding to the operated key to the operation control section 1114.

The operation control section 1114 outputs the operation signal outputted from the operation section 114 to the CPU 1110.

The scanner 115 comprises a light source and a CCD under a transparent contact glass, and read image data of a document placed on the contact glass. In detail, the scanner 115 scans the document with light emitted from the light source, receives reflection by the CCD, converts the reflection photo-electrically and generates image signals.

The reading section 116 comprises a plurality of slots in which various types of storage media can be installed, the various types of storage media such as a semiconductor storage medium formed in a card-shape, a stick-shape or the like, an optical or magnetic storage medium such as a CD-R (Compact Disc-Recordable), a CD-RW (CD-ReWritable), a MD, a DVDRAM (Digital Versatile Disc RAM), a floppy (registered trademark) or the like, or an optical magnetic storage medium such as a MO (Magnet Optical Disc) or the like. The reading section 116 reads out various types of data such as image data, text data or the like stored in various types of storage media installed in the slots. The reading section 116 writes and stores various data instructed to be stored in the specified storage medium according to the instruction of the reader control section 1115.

The reader control section 1115 reads image data read by the scanner 115, controls the reading section 116 to read data out of the storage medium and write and store data in the storage medium, and outputs the read data to the RAM 1112.

The image processing section 1116 performs various types of image processing for image data stored in the RAM 1112, according to the instruction of the CPU 1110. For example, the image processing section 1116 performs image processing for enlarging and reducing, rotating, changing positions, adjusting contrast, enhancing brightness, changing brightness or luminance of colors or the like for images, according to the operation instruction of the operation section 114.

The image forming control section 1117 controls the inkjet-type image forming section 117 and the electrophotography-type image forming section 118 according to the instruction of the CPU 1110, and performs printing processing of image data. The image forming control section 1117 comprises a tray for containing various types of printing papers and a carrier system for carrying the printing papers. The image forming control section 1117 selects any one of the image forming sections 117 and 118 according to the instruction of the CPU 1110, and carries and supplies the printing paper of the type and the size instructed by the CPU 1110 to the selected image forming section.

The inkjet-type image forming section 117 comprises ink cartridges for colors such as cyan, magenta, yellow, block or the like. The image forming section 117 supplies ink to the printing paper supplied by the image forming control section 1117, performs image recording according to image data, and outputs the printed printing paper to a paper eject section 117*a*. The method for supplying ink may be a piezo system, or a thermal inkjet system.

The electrophotography-type image forming section 118 comprises an exposure section 118*a*, a development section 118*b*, a fix section 118*c* and a paper eject section 118*d*. The exposure section 118*a* exposes a photosensitive drum with a laser beam or a LED (Light Emitting Diode), and forms static electric latent image according to image data. Then, the development section 118*b* makes the photosensitive drum adsorb a toner, and transcribes the toner adsorbed by the photosensitive drum to the printing paper supplied by the image forming control section 1117. Thereafter, the fix section 118*c* fixes the toner on the printing paper by heating the photosensitive drum, and ejects the printing paper to the paper eject section 118*d*.

The storage 1118 comprises a HDD (Hard Disc Drive which is not shown in figures), and stores programs or data in the HDD according to the instruction of the CPU 1110. For example, when the CPU 1110 instructs the storage 1118 to write programs or data, the storage 1118 determines space amount of the HDD, and stores specified information in the space area. When the CPU 1110 instructs the storage 1118 to read programs of data, the storage 1118 reads specified information out of the HDD, and outputs the information to the CPU 1110.

The post-processing control section 1119 carries printed matter instructed to be post-processed by the CPU 1110 to the post-processing section 119. Then, the post-processing control section 1119 controls the post-processing 119 to perform the post-processing for the printed matter.

The post-processing section 119 performs the post-processing to the printed mater carried according to the instruction of the post-processing control section 1119, and ejects it to the eject section 119*a*. For example, the post-processing includes punch processing for punching a binding hole at a predetermined position of the printed matter, staple processing for stapling the printed matter, trimmer processing for trimming the printed matter in specified size, pamphlet preparing processing for preparing a pamphlet by folding and binding the printed matter, binding processing for binding the printed matter simply and so on.

The communication control section 1120 comprises a modem, a terminal adaptor, a general serial interface or the like, and controls communication with the portable telephone 130 connected to the connection section 1120*a*. That is, the communication control section 1120 controls the communication with the portable telephone 130 so as to transfer data to the portable telephone 130 or receive data from the portable telephone 130, according to the data transfer timing when the portable telephone 130 performs wireless-communication with an external apparatus on the public network.

The communication control section 1120 controls the communication according to a model of the portable telephone 130. For example, the communication control section 1120 changes various types of communication systems such as a synchronous/asynchronous mode, a data transfer speed, channel control or the like, according to the model of the portable telephone 130 connected to the portable telephone 130. More specifically, the communication control section 1120 prepares a plurality of communication control method according to various types of communication systems, and determines any one of communication systems according to the model of the portable telephone 130 which the user takes with him.

The processing according to the present embodiment will be explained as follows.

The information providing processing performed by the information providing service system 110 shown in FIG. 1 will be explained with flowcharts shown in FIGS. 4A and 4B and menu screen transition views shown in FIGS. 5A to 5D.

The assumption of the explanation is that the user who takes the portable telephone 130 with him or her connects the portable telephone 130 to the connection section 1120a of the image forming apparatus 110, and applies to the image forming apparatus 110 for the information providing service by operating the operation section 114. Although it is explained that the user operates the image forming apparatus 110 by using the operation section 114 with reference to the display screen displayed on the display section 113 of the image forming apparatus 110 according to the embodiment, it is not limited to the present embodiment. The user may operate the image forming apparatus 110 by using a display and an operation section of the portable telephone 130.

Figure 4A:
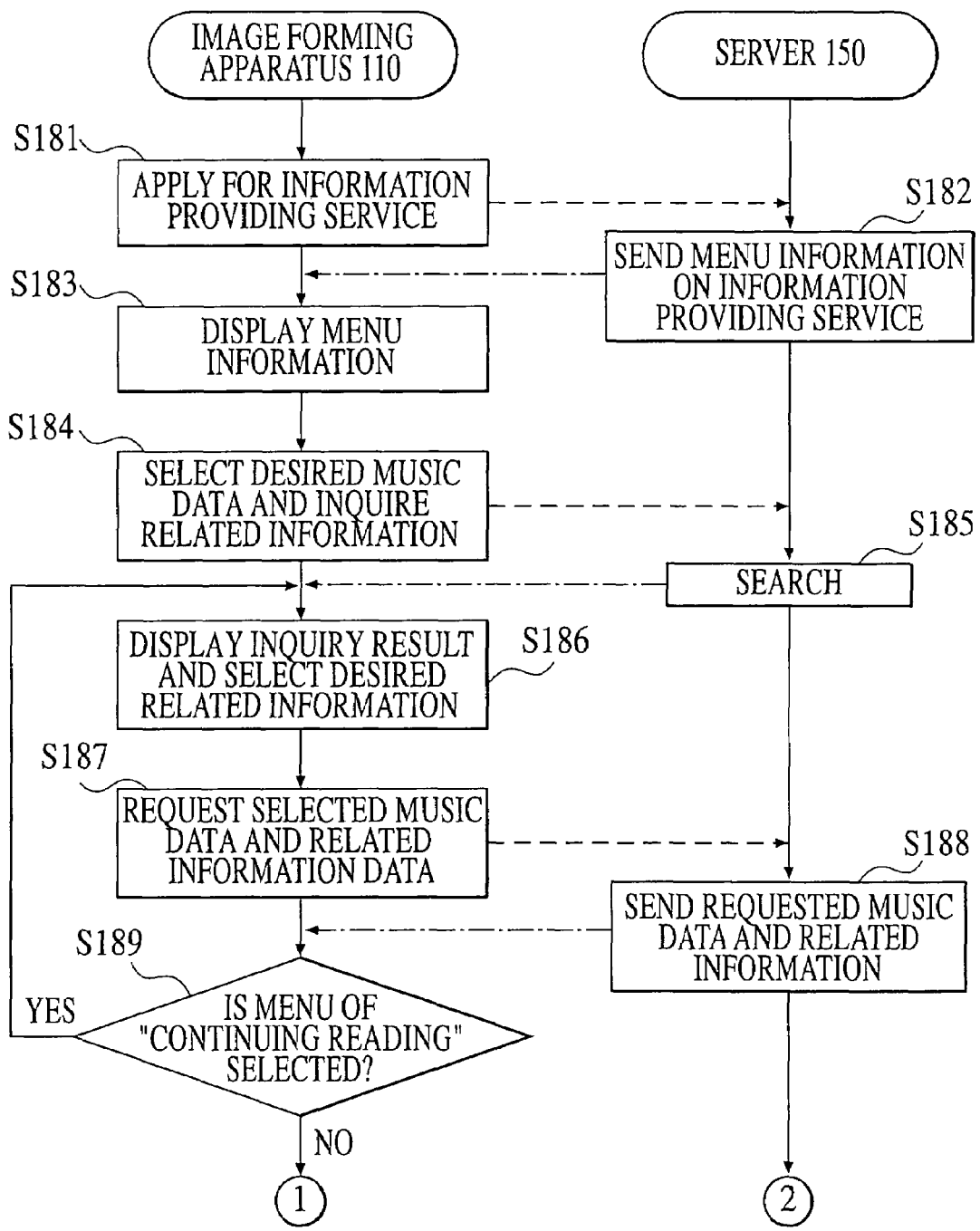
FIGS. 4A and 4B are flow charts for explaining information providing processing performed by the image forming apparatus 110 and a server 150 of an information service center.
Figure 4B:
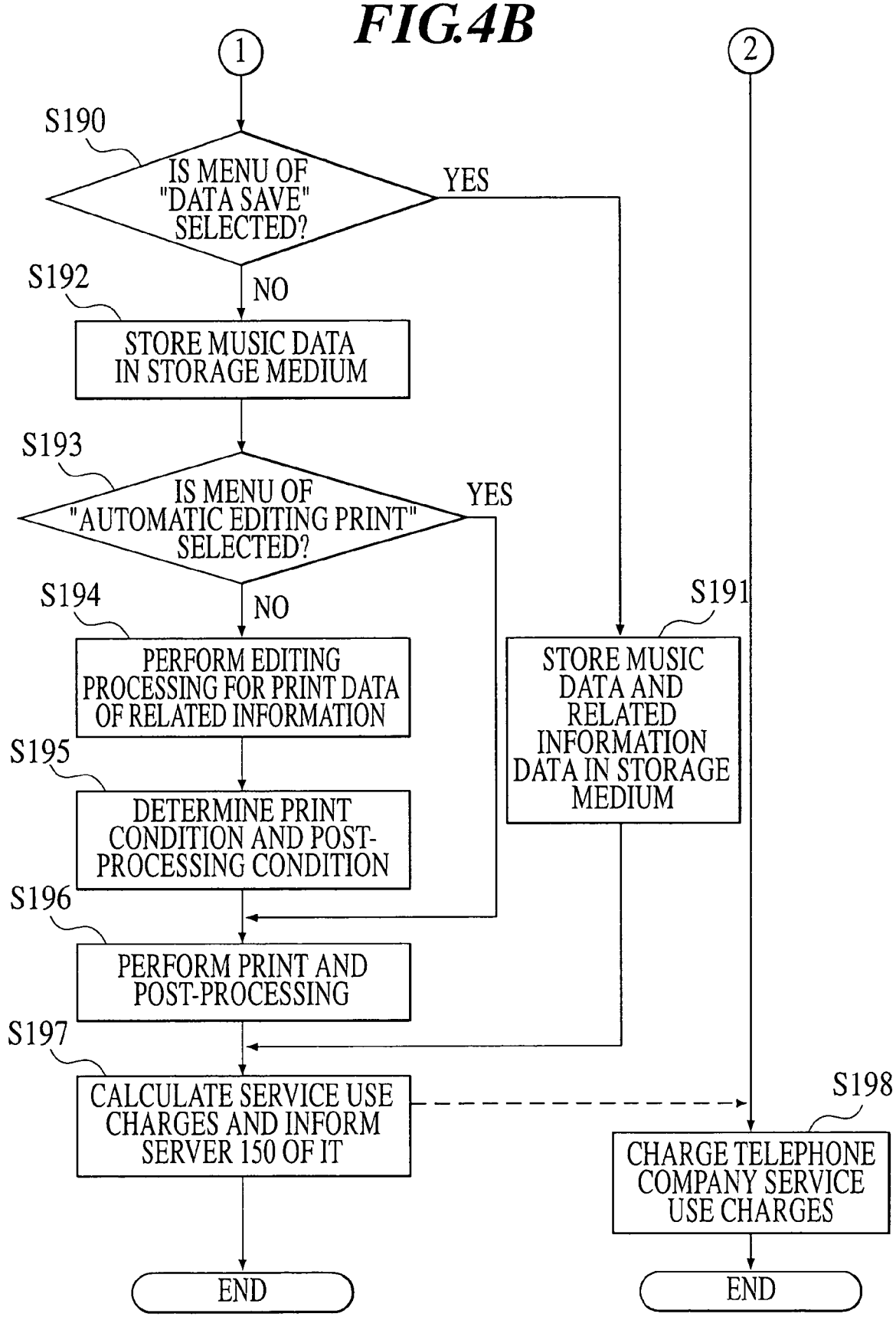

As shown in FIGS. 4A and 4B, when the user connects the portable telephone 130 to the image forming apparatus 110 and instructs on the application for the information providing service, the image forming apparatus 110 is connected to the server 150 of the information service center and applies for the information providing service (Step S181). The call charges of the portable telephone 130 are made. When receiving the application for the information providing service from the image forming apparatus 110, the server 150 sends menu information on the information providing service to the image forming apparatus 110 (Step S182).

Figure 5A:
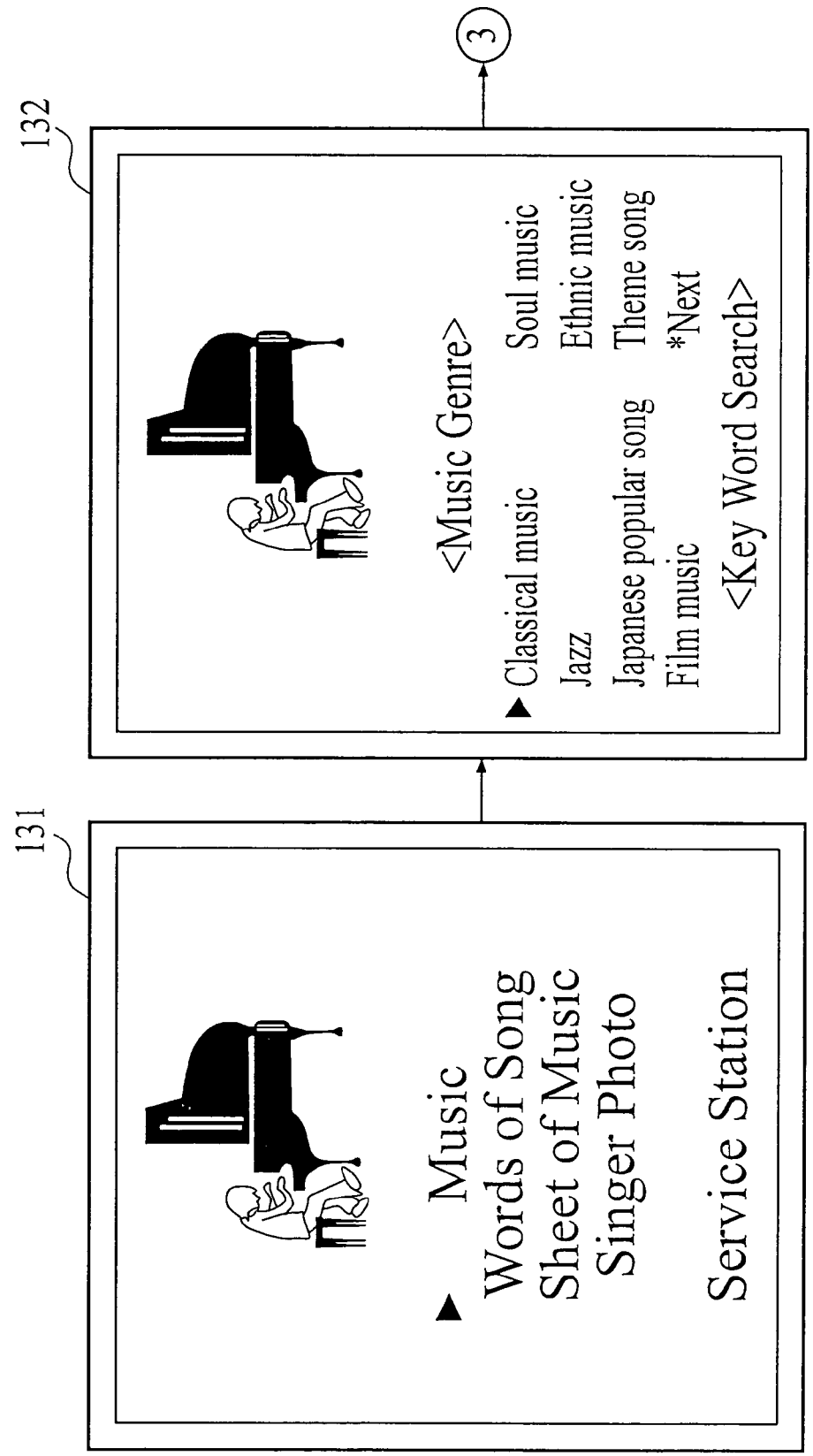
Figure 5B:
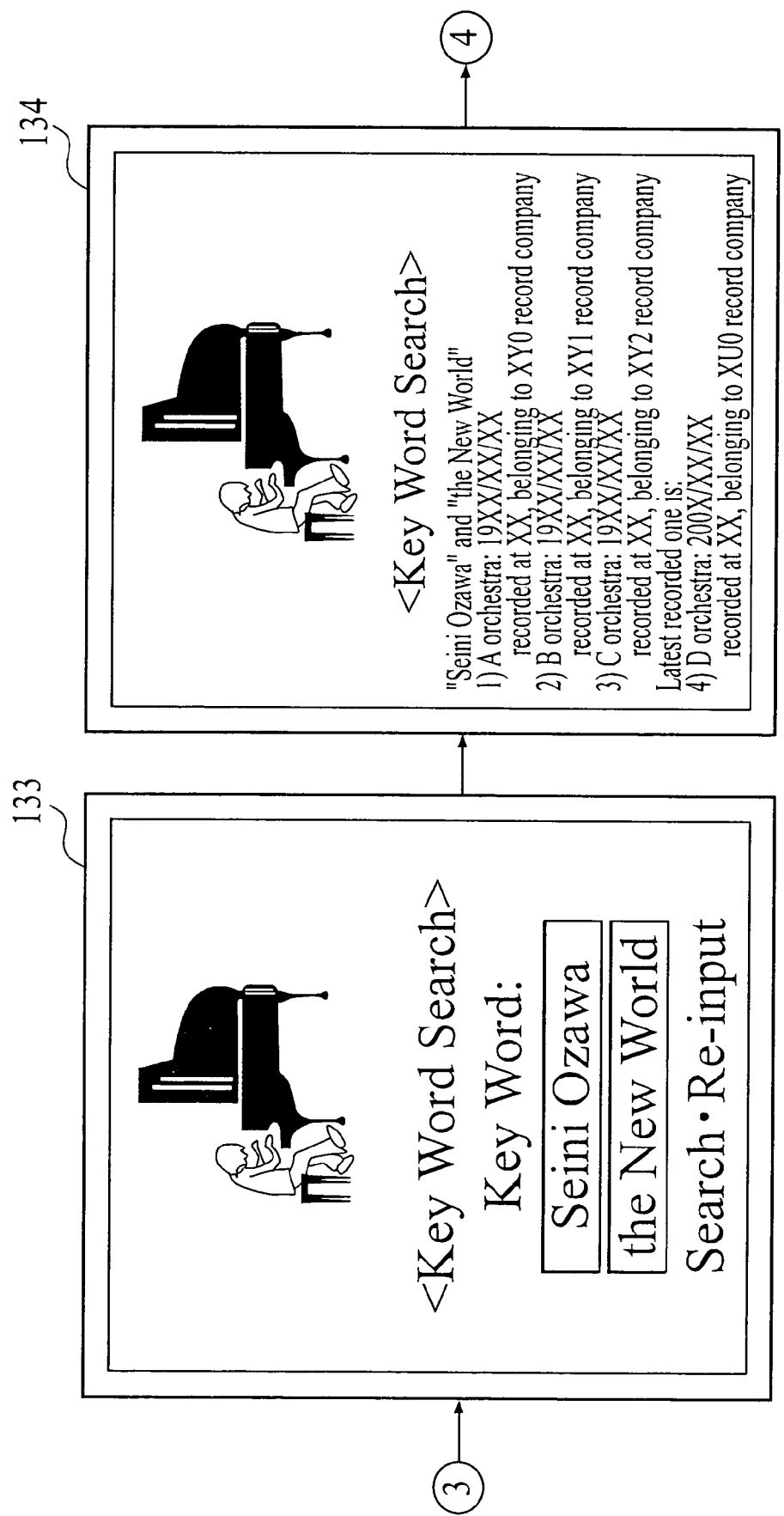
Figure 5D:
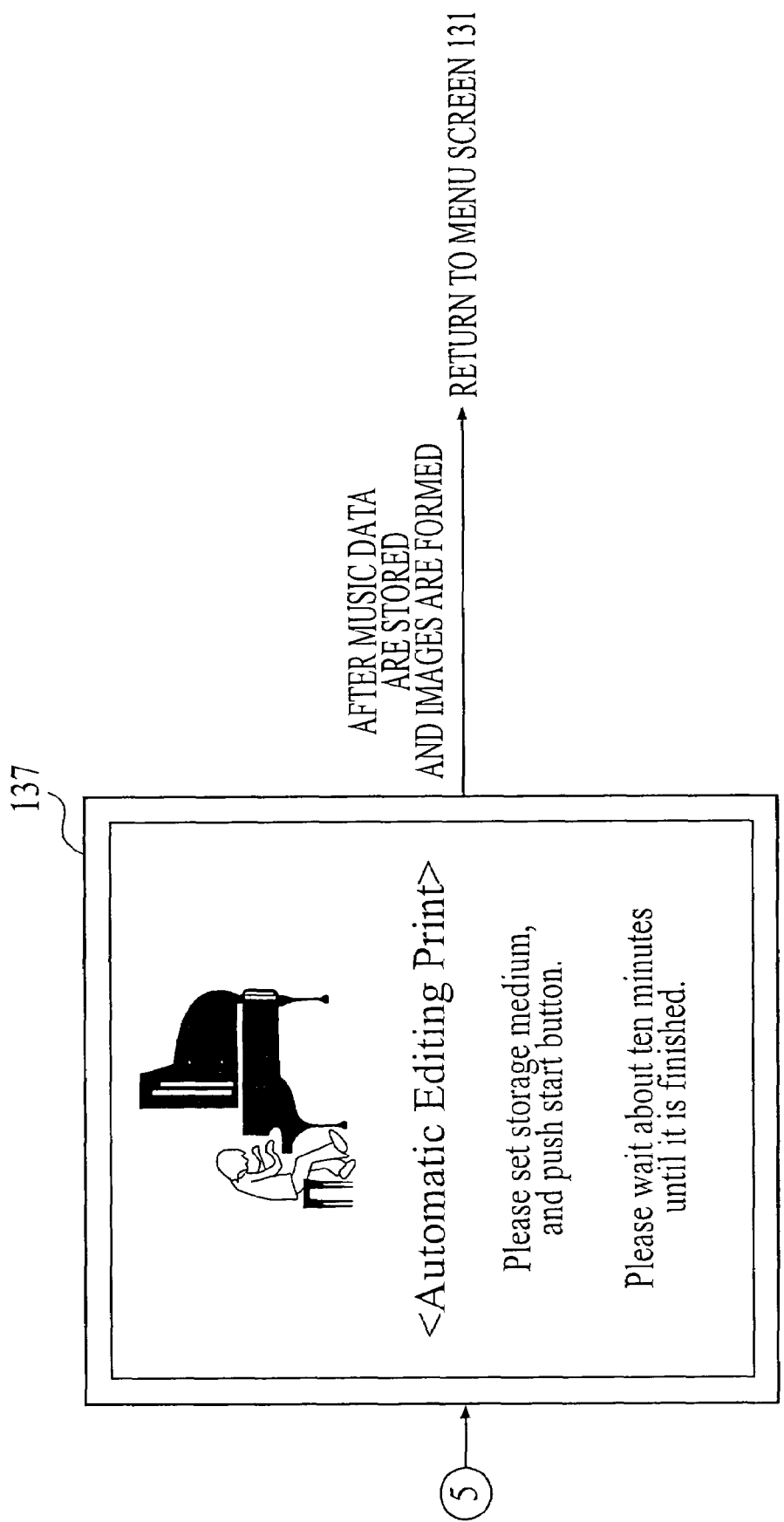

When receiving the menu information on the information providing service from the server 150, the image forming apparatus 110 displays the menu information on the display section 113 (Step S183), for example, a menu screen 131 shown in FIG. 5A. Various types of service menus such as "Music" for downloading music data, "Word of Song" for printing a song-word card or the like, are displayed so as to be selectable on the menu screen 131. Herein, for example, the user will obtain music data in order to prepare a music album of "the New World" conducted by "Seini Ozawa" in the classical music field. Therefore, the user selects the item of "Music" on the menu screen 131 by using the operation section 114.

When the item of "Music" is selected and instructed on the menu screen 131 by the user, the image forming apparatus 110 displays a menu screen 132 on the display section 113 and makes the user select a desired music genre through the operation section 114. When the menu of "Classical music" is selected and instructed, and further "Key Word Search" for searing the desired music in the classical music field is selected and instructed on the menu screen 132 by the user, the image forming apparatus 110 displays a menu screen 133 for inputting key words on the display section 113. When the key words are inputted on the menu screen 133 by the user, the image forming apparatus 110 sends the inputted key words to the server 150 and requests the server 150 to search music data based on the key words. When the server 150 searches music data based on the key words, and sends a result of the search to the image forming apparatus 110, the image forming apparatus 110 displays the search result received from the server 150 on a menu screen 134.

The image forming apparatus 110 displays proposed music data obtained as the search result on the menu screen 134 to make the user select the desired music data by using the operation section 114. The user may select any one of a plurality of music data. The image forming apparatus 110 hatches and displays the proposed music data selected by the user so as to be distinguishable from other proposed music data, as shown in the menu screen 135, and inquires related information on the proposed music data such as words of song, a sheet of music, a guide, images of artist's performance, a recent state of the artist or the like, of the proposed music data, of the server 150 (Step S184). When receiving the inquiry about the related information from the image forming apparatus 110, the server 150 searches the related information on the specified proposed music data, and sends a result of the search to the image forming apparatus 110 as a result of the inquiry (Step S185).

When receiving the inquiry result from the server 150, the image forming apparatus 110 displays the obtained proposed related information as the inquiry result on a menu screen 136. Further, the image forming apparatus 110 displays various types of selectable menus such as a "Continuing Reading" menu, an "Automatic Editing Print" menu, an "Optional Editing Print", a "Data Save" menu or the like, on the menu screen 136. The "Continuing Reading" menu is one for further displaying additional proposed information for the proposed related information obtained as the inquiry result or providing audio-visual service of the proposed music data. The "Automatic Editing Print" menu is one realizable of the second output state for storing selected proposed music data in a storage medium, editing printing layout of the selected proposed related information automatically by the image forming apparatus 110, printing and outputting the selected proposed related information in the predetermined print condition. The "Optional Editing Print" menu is one realizable of the third output state for printing and outputting the selected proposed related information in the print condition including the printing layout of the selected proposed related information, determined by the user. The "Data Save" menu is one realizable of the first output state for storing data of the proposed related information with the music data without printing the data of the proposed related information. Then, the image forming apparatus 110 makes the user select the desired output state of the music data and the related information data and the desired proposed related information by using the operation section (Step S186).

When receiving the instruction to select the proposed related information and the menu selected by the user, the image forming apparatus 110 requests the server 150 to send the proposed music data and the proposed related information data selected by the user (Step S187). Then, the image forming apparatus 110 displays the selection screen for making the user select the type of the storage medium for storing the music data and related information data therein on the display section 113, and displays a message that user installs the storage medium in the reading section 116 (for example, a menu screen 137). When the server 150 sends the music data and the related information data requested by the image forming apparatus 110 to the image forming apparatus 110 (Step S188), the image forming apparatus 110 obtains the music data and the related information data which are the first data and the second data desired by the user from the server 150.

When the "continuing reading" menu is selected by the user in Step S186 (Step S189; YES), the image forming apparatus 110 returns to the process in Step S186. On the other hand, when the "continuing reading" menu is not selected, the image forming apparatus 110 performs the process in next Step S190.

When the "data save" menu is selected by the user in Step S186 (Step S190; YES), the image forming apparatus 110 stores the music data and the related information data obtained from the server 150 in the storage medium installed in the reading section 116 (Step S191), and provides the storage medium in which the data are stored for the user to perform the following process in Step S197. When storing the data in the storage medium, the image forming apparatus 110 attaches electronic watermark data to the data to control the copy of the data.

When the "automatic editing print" menu or the "optional editing print" menu is selected by the user in Step S186 (Step S190; NO), the image forming apparatus 110 stores only the obtained music data in the storage medium installed in the reading section 116 (Step S192).

When the "automatic editing print" menu is selected by the user in Step S186 (Step S193; YES), the image forming apparatus 110 automatically edits the related information data in the printing layout which is previously determined by the image forming apparatus 110, and performs the printing processing and the post-processing to the edited printed data in the predetermined print condition (for example, monochrome, A4 size, stapling or the like). Then, the image forming apparatus 110 provides the storage in which the music data are stored and the printed matter on which the related information data are printed for the user, and performs the following process in Step 197. When storing the music data in the storage medium or printing the printed data and performing the post-processing to the printed matter, the image forming apparatus 110 displays the time required to store the data or perform the print and post-processing to the data on the display section 113, that is, the time to keep the user waiting for the processing to be completed.

When the "optional editing print" menu is selected by the user in Step S186 (Step S193; NO), the image forming apparatus 110 displays the editing screen for the printing layout of the related information on the display section 113, and performs the editing processing for making the user edit and instruct the printing layout through the operation section 114 (Step S194), to generate print data of the related information. More specifically, the image forming apparatus 110 displays the selectable size or type of the printing paper on the editing screen, and further displays images of photographs, sheets of music or the like, texts of sentences or the like included in the related information independently. When the desired printing paper is selected by the user, the image forming apparatus 110 displays a plurality of layout examples according to the printing paper as a basic layout on the editing screen, to make the user select the desired basic layout.

The basic layout is one for dividing the print range into two or three areas vertically or horizontally. According to the editing processing, the image forming apparatus 110 makes the user instruct to arrange the image in any area of the divided areas, and arranges the image in the area and automatically arranges the text in the other divided areas. When there is not any layout desired by the user, the user can generate the desired layout, or the image forming apparatus 110 can delete or insert the images or the texts included in the related information, or change positions, size, color, contrast or the like of the images of the texts according to the edit instruction of the user. In the case, the user can specify the practical range of the image or the text to be edited by surrounding the range by a pointing device such as a mouse, a touch panel or the like, to generate the rough layout.

There is a case that the edit of the printing layout is refused. For example, in case copyrighted matter with the copyright is included in the related information, when the image forming apparatus 110 obtains the related information from the server 150, information as to prohibit the secondary edit is described in header information, or the related information is described in a PDF file format to prohibit to edit the related information by the author. In the case, the image forming apparatus 110 displays a message for informing the user of the fact the edit of the printing layout is prohibited on the display section 113.

When finishing performing the editing processing of the printing layout for the related information as described above, the image forming apparatus 110 displays the selection screen for making the user select the more detailed printing and the more detailed post-processing condition after the print and post-processing, to determine the print condition and the post-processing condition (Step S195). In order to determine the print condition and the post-processing condition, the image forming apparatus 110 first makes the user select the inkjet-type image forming system or the electrophotography-type image forming system to print the printed data. For example, in case of printing photographs, a jacket cover or the like, when forming images according to the inkjet-type, it is possible to obtain the higher-quality photograph image. In case of printing sheets of music, words of song or the like, when forming images according to the electrophotography-type, it is possible to print them finer and more rapidly. The image forming system may be selected by the user manually according to a favorite of the user, or may be selected by the image forming apparatus 110 automatically properly according to the printed data including the images or the texts recognized by the image forming apparatus 110.

When the image forming system is determined, the image forming apparatus 110 makes the user select the more detailed print condition. For example, the image forming apparatus 110 makes the user select the desired print condition such as single/both surfaces print, color/monochrome print or the like. Then, the image forming apparatus 110 displays the selection screen for selecting the post-processing condition when performing the post-processing on the display section 113, and displays the simple post-processing such as stapling, punching, folding or the like or the post-processing such as pamphlet preparing, binding or the like, so as to be selected by the user on the selection screen, to make the user select and instruct desired post-processing through the operation section 114. When the pamphlet preparing or the binding is selected by the user, the image forming apparatus 110 performs the page layout automatically, and displays a sample of the printed page so that the user confirm the page layout of each page substantially. As described above, when the print condition and the processing condition including the printing layout is selected and determined, the image forming apparatus 110 performs the print and post-processing to the printed data of the related information in the determined conditions (Step S196), and provides the storage medium in which the music data are stored and the printed matter on which the related information data are printed for the user.

When finishing storing the music data or storing or performing the print and post-processing to the related information data as described above, the image forming apparatus 110 calculates and displays use charges of the information providing service on the display section 113. Then, the image forming apparatus 110 informs the user of that the use charges is made with call charges of the portable telephone 130 later and the server 150 of the use charges (Step S197), and finishes the information providing processing. When receiving the information of the service use charges from the image forming apparatus 110, the server 150 specifies the telephone number of the portable telephone 130 of the user and charges the telephone company 140 the service use charges of the user based on the specified telephone number (Step S198), and finishes the information providing processing. The telephone company 140 charges the user based on the telephone number specified by the server 150 the charged service use charges and the call charges of the portable telephone 130.

As described above, because the server 150 of the information service center stores and manages the secondary data obtained by editing the music data and the related information on the music data, the image forming apparatus 110 can access to the server 150 through the portable telephone 130 which the user takes with him or her. Consequently, the image forming apparatus 110 can not only obtain the music data desired by the user from the server 150 and store them in the storage medium, but also obtain the related information data on the music data and store them in the storage medium, print them or perform the post-processing to the printed matter, to provide it for the user. As a result, the image forming apparatus 110 can prepare an original music album on user's demand and provide the high-quality printed matter for the user.

The image forming apparatus 110 can select the output state from the first output state for storing the music data and the related information data in the storage medium, the second output state for storing the music data in the storage medium and putting the related information data in the predetermined condition by the image forming apparatus 110 and performing the post-processing to the printed matter, and the third output state for storing the music data in the storage medium and printing the related information data in the condition desired by the user and performing the post-processing to the printed matter. Accordingly, the image forming apparatus 110 can provide the music data and the related information in the output state on user's demand for the user. Further, because the image forming apparatus 110 can prepare the pamphlet or binding the printed matter simply by performing the print and post-processing, the image forming apparatus 110 can provide the high-quality finished printed matter on user's demand.

Further, because the image forming apparatus 110 provides the high-quality inkjet-type image forming system and the high-productivity electrophotography-type image forming system, it is possible to select the most suitable image forming system and provide the most suitable print condition to the use.

Further, because the image forming apparatus 110 informs the server 150 of the service use charges and the server 150 manages the charges, it is possible to provide the simple charge collecting system. Since it is unnecessary that the user prepares cash even when using the service, the convenience improves. For example, it is possible to provide the charge collecting system that when the server 150 charges the telephone company 140 of the portable telephone 130 of the user the use charges, the telephone company 140 charges the user the use charges with the call charges.

The image forming apparatus 110 and the information providing service system 100 have been described in the first embodiment as a preferable example, and is not limited to it.

For example, it has been explained that the image forming apparatus 110 applies the inkjet-type and the electrophotography-type as the first and second image forming sections as claimed in claims according to the first embodiment. However, the image forming apparatus 110 may apply any two different image forming members of a large number of systems such as a dot impact type, a thermal transcription system or the like.

The image forming apparatus 110 may select any one of an account method for paying use charges of the information providing service system 100 in cash by using an account apparatus such as a coin mech. or the like, and the account method for paying use charges by charging them the portable telephone 130.

In addition, the detailed structure and the detailed operation of the image forming apparatus 110, or each section included in the information providing service system 100 can be modified properly without departing from the gist of the present invention.

As described above, the image forming apparatus 110 according to the first embodiment, obtains the music data which are the first data and the related information data which are the second data from the server 150 through the portable telephone 130, and selects the output state of each data. Consequently, the image forming apparatus 110 can provide data desired by the user in the output state on user's demand.

Further, when the first output state is selected, because the image forming apparatus 110 stores the first and second data in the storage medium, it is possible to provide each data as electronic data for the user.

Further, when the second output state is selected, because the image forming apparatus 110 stores the first data in the storage medium and prints the second data in the predetermined suitable print condition automatically, it is possible to provide the first data desired by the user as electronic data and the second data as high-quality printed matter for the user rapidly.

Further, when the third output state is selected, because the image forming apparatus 110 stores the first data in the storage medium and prints the second data in the print condition determined by the user, it is possible to provide the first data desired by the user as electronic data and the second data as high-quality printed matter printed in the print condition desired by the user for the user.

Further, because the image forming apparatus 110 performs the post-processing to the printed matter as the second data, it is possible to provide the printed matter with which the user is satisfied sufficiently.

Further, because the image forming apparatus 110 selects any one of the inkjet-type of the first image forming section and the electrophotography-type of the second image forming section, it is possible to form high-quality images according to use, and provide the most suitable print condition.

Further, because the image forming apparatus 110 select the storage medium for storing the first or second data therein, it is possible to store data in the storage medium desired by the user, and meet user's demand more.

Further, because the image forming apparatus 110 calculates charges and informs the server of the charges, the server can manage the charges collectively. As a result, it is possible to collect the charges easily.

Further, because the image forming apparatus 110 attaches the electronic watermark data to data when storing the data in the storage medium, it is possible to control the copy and reproduction of the data and protect the copyright after providing the data for the user.

Second Embodiment

Next, the second embodiment of the present invention will be explained in detail, with reference to figures.

As follows, although the present invention will be explained in case the present invention is applied to a publishing service for printing/binding and providing a publication on user's demand, it is not limited to the case.

Figure 6:
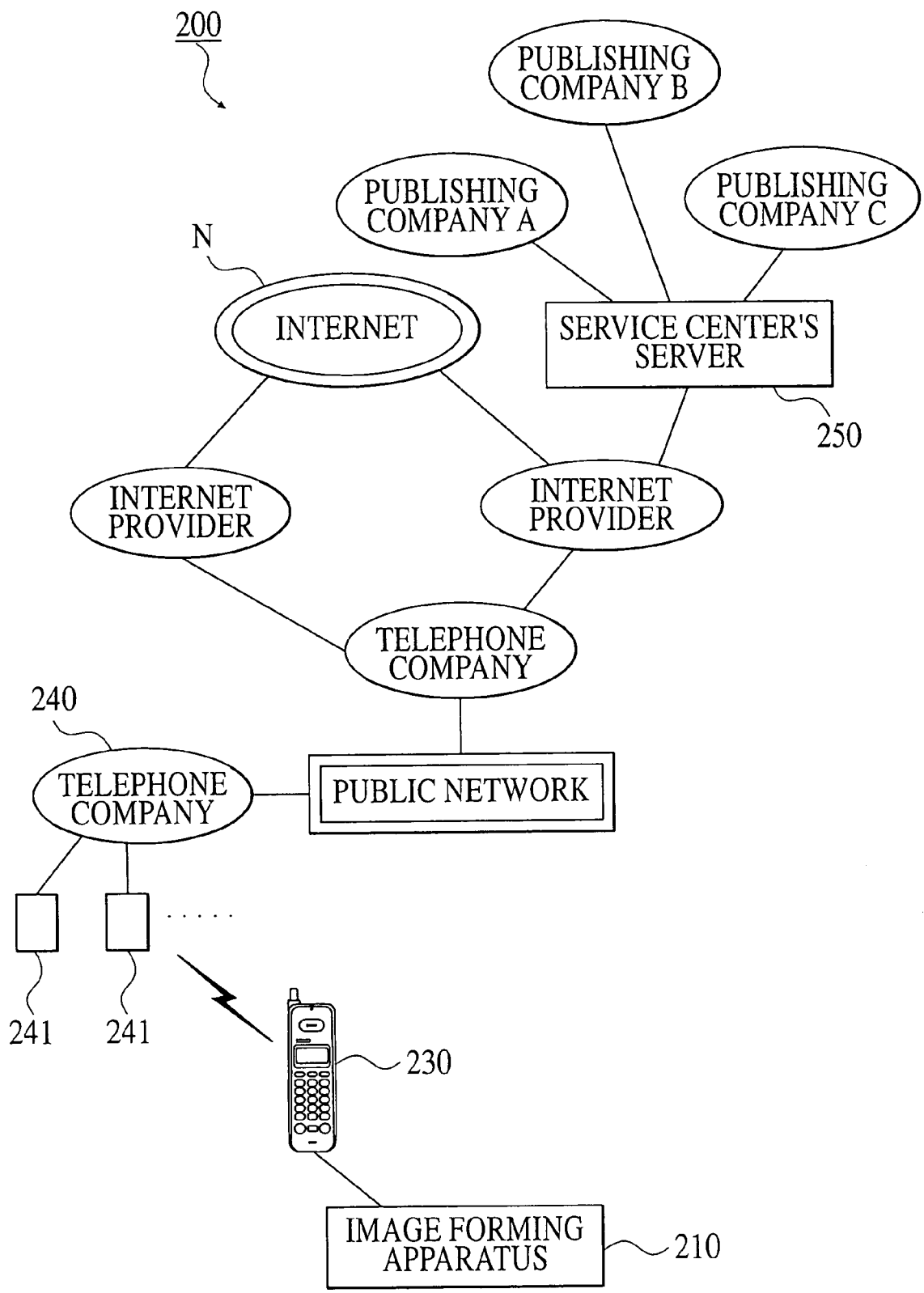
FIG. 6 is a conceptual view showing a whole structure of a publishing service system 200 according to a second embodiment to which the present invention is applied.

FIG. 6 is a schematic view showing a publishing service system 200 as a service system of the publishing service according to the second embodiment. Herein, the "publishing service" will be explained as a service for selecting only articles desired by a user from serial articles appeared in a plurality of magazines published periodically, editing the selected articles to one, and providing one publication for the user.

As shown in FIG. 6, the publishing service system 200 comprises an image forming apparatus 210 provided at a shop such as a convenience store or the like, a portable telephone 230 which the user takes with him or her, and a server 250 provided at a service center.

The image forming apparatus 210 controls the portable telephone 230 connected thereto, to connect to the server 250 through the portable telephone 230. Then, the image forming apparatus 210 obtains electronic data to which articles desired by the user published in magazines are edited from the server 250, the electronic data which will be called "provided article data". Thereafter, the image forming apparatus 210 performs printing/binding processing based on the obtained provided article data, to provide the publication for the user.

The portable telephone 230 is a portable communication terminal which the user takes with him or her, and is realized by a well-known wireless telephone comprising a wireless call function and a wireless data communication function, like the portable telephone 130 according to the first embodiment. The portable telephone 230 performs data communication with the server 250 through a wireless base station 241 belonging to a telephone company 240 with which the portable telephone 230 makes a contract. That is, when the portable telephone 230 is connected to the image forming apparatus 210, it mediates communication between the image forming apparatus 210 and the server 250.

The server 250 is managed by the service center for providing the publishing service according to the second embodiment, and is realized by a well-known server apparatus. The server 250 is connected to publishing company servers provided at publishing companies A, B and C. Therefore, when the service server closes license contracts with the publishing companies A, B and C, the server 250 is allowed to use electronic data of articles appeared in magazines which are published by the publishing companies and the copyrights of which belong to the publishing companies. Therefore, the server 250 can obtain and store the electronic data (hereinafter, it will be called "stored article data") previously.

The server 250 extracts stored article data desired by the user from the stored article data which are stored previously, and generates provided article data. When receiving request to send the data from the image forming apparatus 210, the server 250 sends the specified provided article data to the image forming apparatus 210.

Then, the image forming apparatus 210 and the server 250 will be explained in detail.

Figure 7:
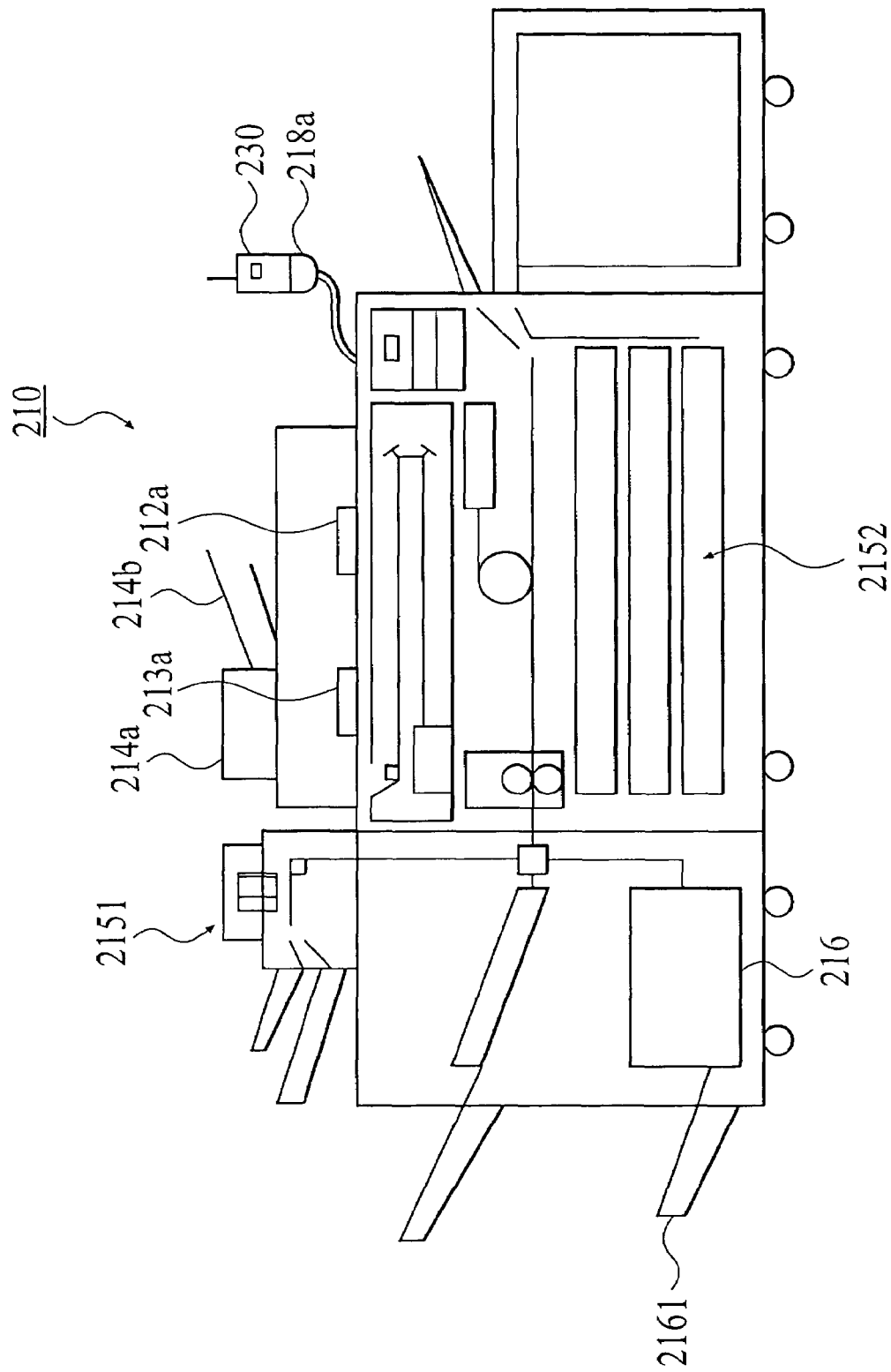
FIG. 7 is an external appearance view of an image forming apparatus 210 of the publishing service system 200 shown in FIG. 6.

As shown in FIG. 7, the image forming apparatus 210 comprises a display panel 213a, an operation panel 212a, a scanner cover 214a, a connector 218a to which the portable telephone 230 is connected, a document table 214a and an inkjet-type image forming section 2151 on an upper surface of the apparatus body, and an electrophotography-type image forming section 2152 and a post-processing section 216 in an inside of the apparatus body.

Figure 8:
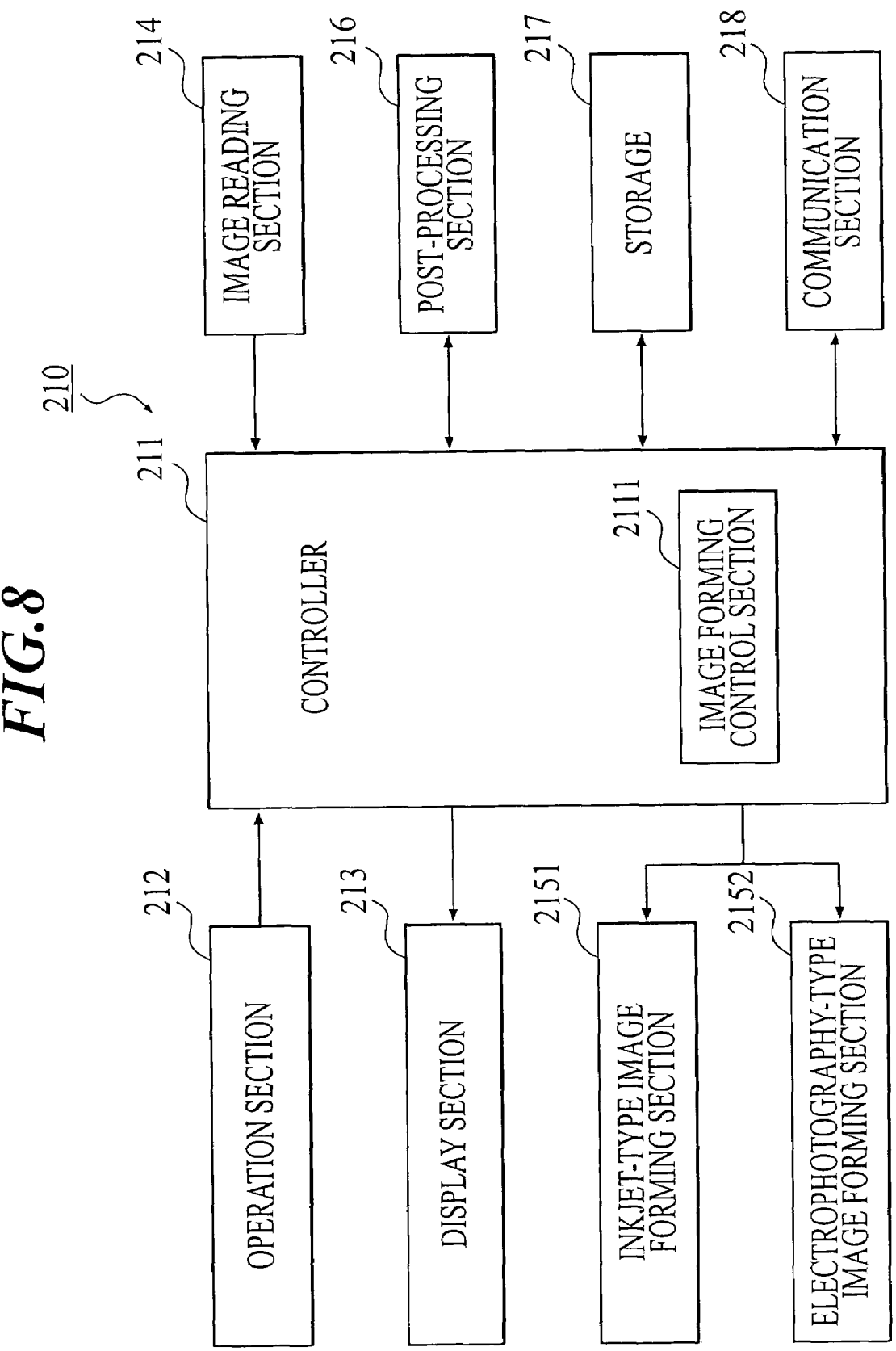
FIG. 8 is a block diagram showing a functional structure of a main part of the image forming apparatus 210 shown in FIG. 7.

FIG. 8 is a block diagram showing a functional structure of the image forming apparatus 210.

As shown in FIG. 8, the image forming apparatus 210 comprises a controller 211, an operation section 212, a display section 213, an image reading section 214, the inkjet-type image forming section 2151, the electrophotography-type image forming section 2152, the post-processing section 216, a storage 217 and a communication section 218.

The controller 211 comprises and is realized by a CPU (Central Processing Unit), a ROM (Read Only memory), a RAM (Random Access Memory) or the like. The controller 211 controls each section for the image forming apparatus 210 in a concentrated way.

More specifically, when the CPU responds to a signal inputted through the communication section 218 or the operation section 212, the CPU reads out various types of control programs stored in the ROM or the storage 217 and develops them in the RAM. Then, the CPU performs various processing according to the programs, to make each section function of the image forming apparatus 210 function. At the time, the CPU stores results of the processing in the RAM, and displays them in the display section 213 or sends them to the server 250 through the communication section 218 or the portable telephone 230, as necessary.

The ROM is a read-only semiconductor memory, and stores the basic programs performed by the CPU, data or the like. The ROM may be an erasable/writable storage medium. In the case, the ROM has a structure for obtaining and storing programs or data inputted from an external through the communication section 218 so that the CPU performs various processing according to the programs or the data.

The RAM is a storage medium for storing data temporally. A program area in which the programs to be performed by the CPU are developed, a data area for storing data inputted through the communication section 218 or the operation section 212, results of various processing performed by the CPU or the like, an image data area for storing image data inputted through the image reading section 214 or the communication section 218 are formed in the RAM.

The controller 211 comprises functions of an image forming control section 2111 and a printer controller. According to the function of the printer controller, the controller 211 determines whether full-color photograph data are included in the provided article data sent from the server 250 through the communication section 218 or not.

The image forming control section 2111 controls the inkjet-type image forming section 2151 and the electrophotography-type image forming section 2152 according to the result that the function of the printer controller determines whether the full-color photograph data are included in the provided article data or not, to perform print processing to the provided article data. The image forming control section 2111 comprises a tray for containing various types of printing papers, and a carrier mechanism for carrying the printing paper. Therefore, the image forming control section 2111 carries and supplies the specified type and size of the printing paper to the image forming section 2151 or 2152 to perform the print processing.

The operation section 212 is an input member used by the user for inputting, for example, a user name as an account as follows, or an electronic key. Therefore, the operation section 212 corresponds to the operation panel 212a comprising numeric keys or various types of function keys (a start button or the like) shown in FIG. 7. When any key is pushed, the operation section 212 outputs the pushed signal to the controller 211. The operation section 212 may be a touch panel which combines the operation section 212 with the display section 213.

The display section 213 corresponds to the display panel 213 consisting of a LCD (Liquid Crystal Display), a TFT (Thin Film Transistor) or the like, shown in FIG. 7. The display section 213 displays, for example, a screen such as a menu screen, a determination screen for the printing system as follows or the like thereon, according to a display signal outputted from the controller 211.

The image reading section 214 reads out predetermined documents placed on the document table 214b according to a reading signal outputted from the controller 211. The image reading section 214 includes the scanner cover 214a and the document table 241b shown in FIG. 7, and a scanner under the document table 214b. The scanner comprises a light source, a lens, a CCD (Charge Coupled Device) or the like. When the scanner makes the light source irradiate light to the document and scans the document with the light, the scanner reads out the image of the document by gathering and converting the reflection photo-electrically. The image data read by the image reading section 214 are stored in the RAM of the controller 211 temporarily. The image includes not only image data of figures or photographs but also text data of characters, marks or the like.

The inkjet-type image forming section 2151 is an image forming member for forming images according to the inkjet system. More specifically, the inkjet-type image forming section 2151 comprises ink cartridges for colors such as cyan, magenta, yellow, black or the like. The inkjet-type image forming section 2151 ejects ink dots to the printing paper to records the image on the printing paper according to image data outputted from the image forming control section 2111. The ink ejecting method may be any system such as the bubble jet (registered trademark) system, a thermal ink jet system, a piezo system or the like.

The electrophotography-type image forming section 2152 is an image forming member for forming images according to the electro-photographic system. More specifically, the electrophotography-type image forming section 2152 comprises an electrification section, an exposure section, a development section, a fix section or the like. The exposure section exposes a photosensitive drum with a laser beam or a LED (Light Emitting Diode), and forms static electric latent image according to image data on the photosensitive drum. Then, the development section makes the photosensitive drum adsorb a toner, and transcribes the toner adsorbed by the photosensitive drum to the printing paper supplied by the image forming control section 2111. Thereafter, the fix section fixes the toner on the printing paper by heating the photosensitive drum.

The printing papers on which the images are formed (printed) based on the image data by the inkjet-type image forming section 2151 or the electrophotography-type image forming section 2152 are carried to the post-processing section 216 by a carrying system controlled by the controller 211, in order.

The post-processing section 216 performs a predetermined post-processing to the carried printed matter, and ejects it to an eject tray 2161 according to the instruction of the controller 211. For example, the post-processing includes not only simple post-processing such as punch processing for punching a binding hole at a predetermined position of the printed matter, staple processing for stapling the printed matter, trimmer processing for trimming the printed matter in specified size or the like, pamphlet preparing processing for preparing a pamphlet by folding and binding the printed matter, binding processing for binding the printed matter simply and so on.

The storage 217 comprises, for example, a HDD (Hard Disc Drive), and stores programs or data in the HDD according to the instruction of the controller 211. For example, when the controller 211 instructs the storage 217 to write programs or data, the storage 217 determines space amount of the HDD, and stores specified information in the space area. When the controller 211 instructs the storage 217 to read programs of data, the storage 217 reads specified information out of the HDD, and outputs the information to the controller 211.

The storage 217 stores processing programs, processing data or the like for performing various types of processing according to the present invention. The processing program includes a program for performing printed matter providing processing (shown in FIGS. 14A and 14B) as follows, and the processing data include printing data for a cover sheet, electronic watermark data for controlling a copy of the publication and protecting the copyright or the like.

The communication section 218 includes the connecter 218a shown in FIG. 7, and is a communication member for transferring data with the portable telephone 230 connected to the connector 218a. That is, when the user connects a connecter provided at a lower portion of the portable telephone 230 to the connecter 218a, the communication section 218 performs data communication between the image forming apparatus 210 and the portable telephone 230.

Figures 9, 10:
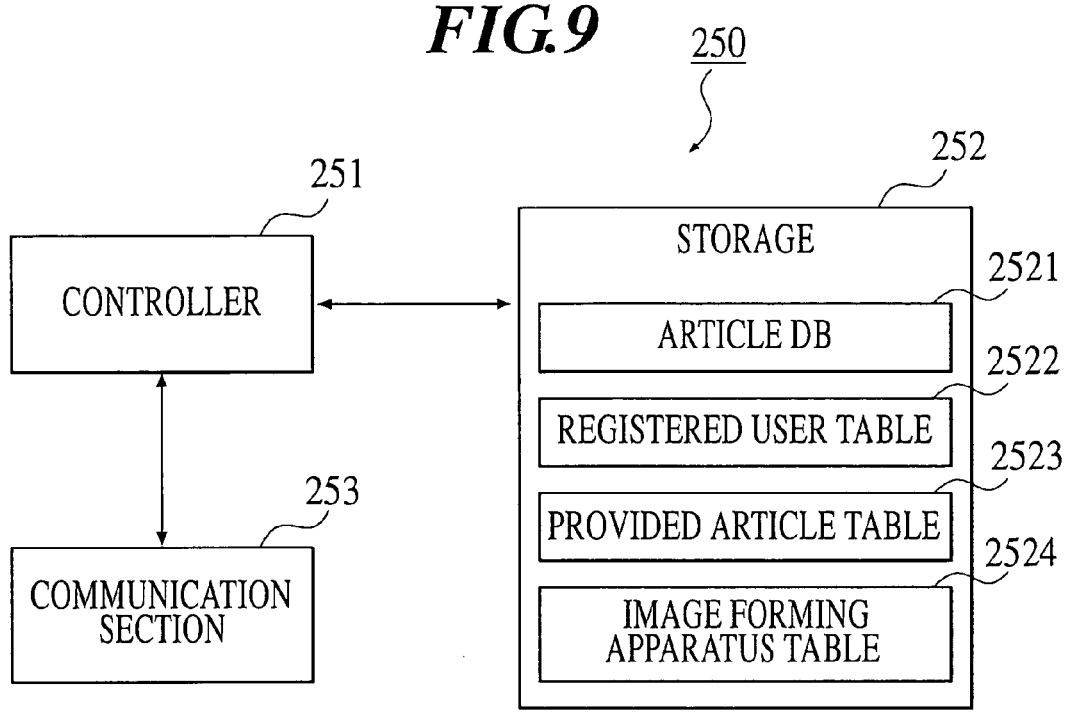
FIG. 9 is a block diagram showing a functional structure of a main part of a server 250 of the publishing service system 200 shown in FIG. 6.
FIG. 10 is a table showing an example of a data structure of a registered user table 2522 of the server 250.

FIG. 9 is a block diagram showing a functional structure of the server 250.

As shown in FIG. 9, the server 250 comprises functional sections of a controller 251, a storage 252 and a communication section 253.

The controller 251 is realized by a CPU, a ROM, a RAM or the like, and controls each section for the server 250 in a concentrated way.

More specifically, the CPU reads out various control programs stored in the ROM or the storage 252 and develops the programs in the RAM according to signals inputted through the communication section 253. Then, the CPU performs various types of processing based on the programs to make each section of the server 250 function. At the time, the CPU stores results of various types of processing in the RAM, and sends the results from the communication section 253 to the image forming apparatus 210 through the portable telephone 230 as necessary.

The ROM is a read-only semiconductor memory, and stores basic programs performed by the CPU, data or the like.

The RAM is a storage medium for storing data temporarily. The RAM has a program area for developing programs performed by the CPU 1110, a data area for storing data inputted through the communication section 253, results of various processing performed by the CPU or the like, an image data area for temporarily storing image data inputted through the communication section 253 or the like.

The storage 252 comprises, for example, a HDD (Hard Disc Drive), and stores programs, data or the like in the HDD according to the instruction of the controller 251. For example, when the controller 251 instructs the storage 252 to write programs or data, the storage 252 determines space amount of the HDD, and stores specified information in the space area. When the controller 251 instructs the storage 252 to read programs of data, the storage 217 reads specified information out of the HDD, and outputs the information to the controller 251.

The storage 252 stores processing programs, processing data or the like for making the controller 251 perform various types of processing according to the second embodiment. The processing program includes programs for performing the printed matter providing processing (shown in FIGS. 14A and 14B) and provided article data generating processing (shown in FIG. 15) as follows. The processing data include an article DB 2521, a registered user table 2522, a provided article table 2523 and an image forming apparatus table 2524.

The article DB 2521 is a database for storing a lot of electronic data (that is, stored article data) of articles appeared in magazines which are published by the publishing companies A, B and C and the copyrights of which belong to the publishing companies A, B and C, so that the server 250 is allowed to use the electronic data because the service server closes license contracts with the publishing companies A, B and C. The stored article data are classified/stored according to a predetermined classification such as, for example, the publishing company, the magazine in which the article data are appeared, the author or the like, and the most latest data are stored at any time. The stored article data include text data such as characters, marks or the like, photograph data and so on.

The registered user table 2522 is a table for managing information on users which are registered in the service center and desire to have the publishing service, and one example of a data structure of the registered user table 2522 is shown in FIG. 10.

FIG. 10 is a table showing an example of a data structure of the registered user table 2522.

As shown in FIG. 10, the registered user table 2522 stores data of an electronic mail address, an address, the date (receiving desired data) on which the user desires to receive the publication and the article (receiving desired article) related to a name (user name) of the user desiring to have the publishing service, for every user name.

Herein, the electronic mail address is used for informing the user of the state capable of providing the publication. The address is used for determining the nearest image forming apparatus 210 capable of providing the publication for the user. That is, the electronic mail including the name of the shop at which the nearest image forming apparatus 210 is disposed and the following electronic key is sent to the electronic mail address, so as to inform that the publication can be provided.

The receiving desired article includes a condition concerning the article which the user desires to receive, that is, an extraction condition for extracting predetermined provided article data from the article DB 2521. The detailed data structure of the receiving desired article is shown in FIG. 11.

FIG. 11 is a table showing an example of the data structure of the receiving desired article. As shown in FIG. 11, the data structure of the receiving desired article corresponding to the user "All" in FIG. 10.

As shown in FIG. 11, the receiving desired article includes data of a name of the magazine in which the article is appeared, the publication data of the magazine and a name of the publishing company related to a title (article title) of the article which the user desires to receive, for every article title. The user can desire to receive some articles.

That is, the user "A" is registered so as to receive three articles on the 30th every month, the three articles including (1) the "serial article by O.A." appeared in the magazine "monthly magazine T" published from the publishing company A on the 10th every month, (2) the "serial article by R.T." appeared in the magazine "T and R's travel diary" published from the publishing company B on the 20th every month, and (3) the "serial article by S.M." appeared in the magazine "monthly visit to gourmet restaurant" published from the publishing company C on the 25th every month.

Herein, the receiving desired article can be registered in the service center according to any method. For example, when the user accesses to the Web site provided by the server 250 through the portable telephone 230 or a PC (Personal Computer) comprising the browser function, inputs predetermined matters in a format of a registration page and sends them, the receiving desired article can be registered in the service center.

The provided article table 2523 is a table for managing information as to provide the publishing service for the registered user, and one example of a data structure of the provided article table 2523 is shown in FIG. 12.

FIG. 12 is a table showing an example of the data structure of the provided article table 2523.

As shown in FIG. 12, the provided article table 2523 stores provided article data and data of an electronic key related to the registered user name, for every user name.

The provided article data are data generated based on the receiving desired article so as to be sent to the image forming apparatus 210 on the date (receiving desired date) on which the user desires to receive.

For example, concerning the above-described user "A", the provided article data are data to which electronic data of three articles (1) to (3) in FIG. 11 are edited, and generated on the day before the receiving desired data so as to be sent on the 30th every month as the receiving desired date.

The electronic key is one of identification information used to identify the user as a legal user when the user has the publishing service by using the image forming apparatus 210. The different electronic key is related to each provided article data.

The image forming apparatus table 2524 is a table for managing information on the image forming apparatus 210 capable of providing the publication according to the publishing service, that is, the image forming apparatus 210 capable of performing the printing/binding based on the provided article data by obtaining the provided article data from the server 250. One example of a data structure of the image forming apparatus table 2524 is shown in FIG. 13.

FIG. 13 is a table showing an example of the data structure of the image forming apparatus table 2524.

As shown in FIG. 13, the image forming apparatus table 2524 stores a disposed place (the shop name, the address or the like) to which the image forming apparatus 210 is disposed for every identification number of the image forming apparatus 210 as an object of management.

When the electronic mail is sent so as to inform the user of that the desired publication can be provided for the user, the name of the shop at which the nearest image forming apparatus 210 to the address of the user is disposed are searched on the image forming apparatus table 2524. One or a plurality of names of shops may be searched as described above.

The communication section 253 shown in FIG. 9 is an interface for communicating data with another apparatus (mainly, the portable telephone 230, publishing company servers disposed at the publishing companies A, B and C) through the Internet when connected to an Internet provider. The communication section 253 comprises, for example, a router.

Next, the processing according to the second embodiment will be explained.

Figure 14A:
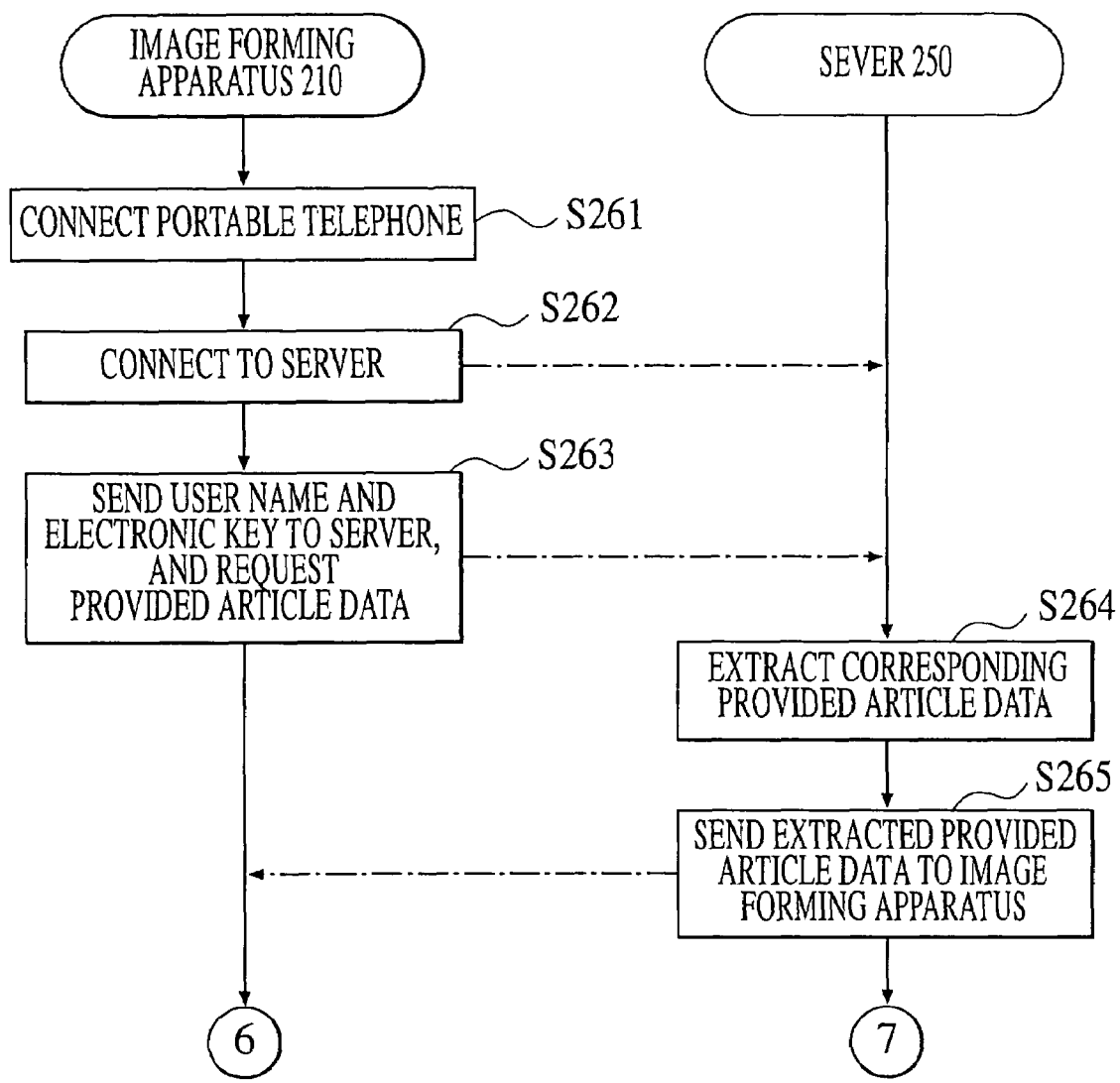
FIGS. 14A and 14B are flowcharts showing printed matter providing processing performed by the image forming apparatus 210 and the server 250.
Figure 14B:
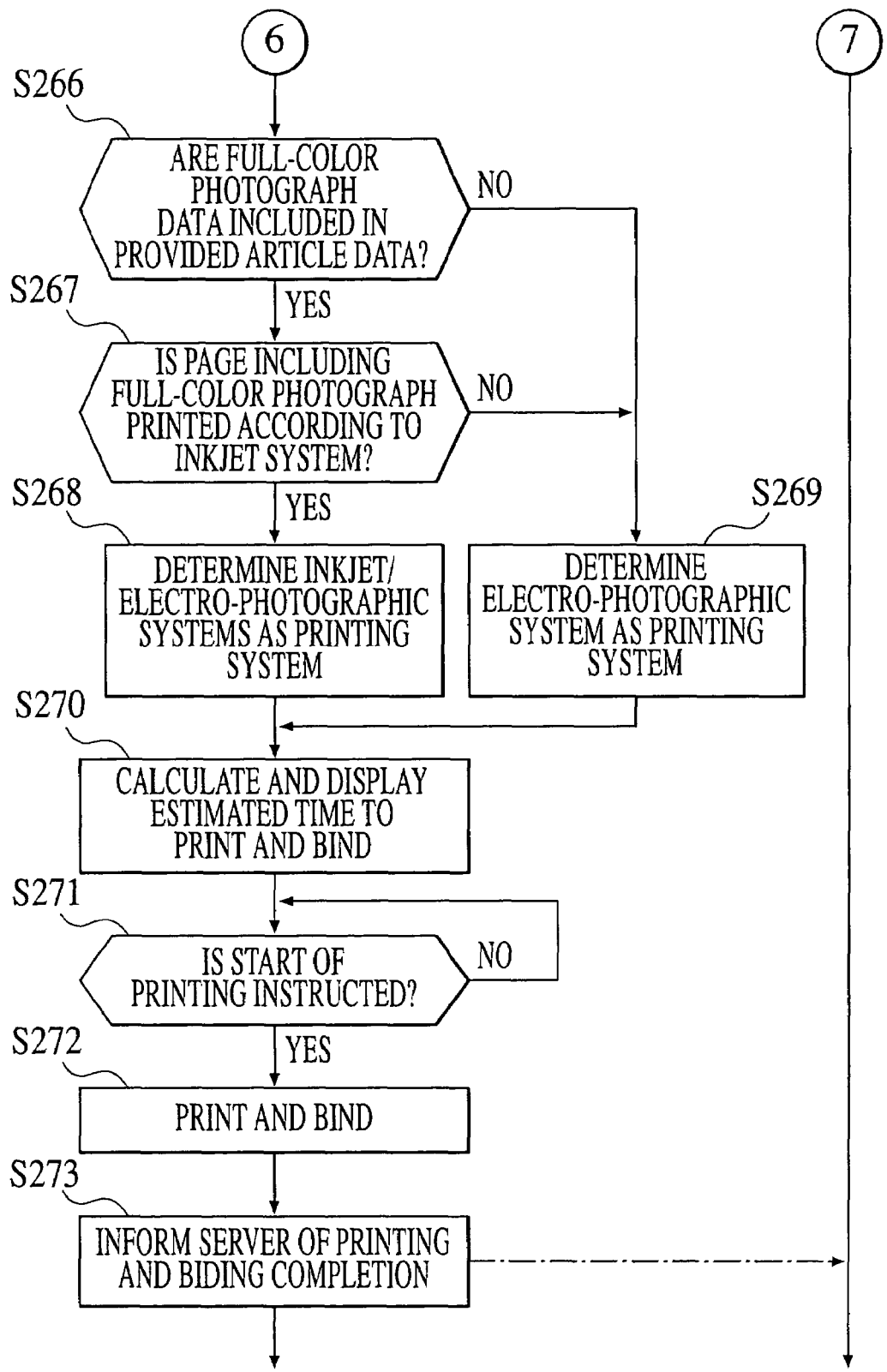

FIGS. 14A and 14B are flowcharts showing the printed matter providing processing. The printed matter providing processing is processing performed when the user receives the desired publication by using the image forming apparatus 210. According to the processing, the user inputs operations through the operation section 212 with watching the screen displayed on the display section of the image forming apparatus 210. The user is not limited to it, and can input operations by using a display section and an operation section of the portable telephone 230.

As shown in FIGS. 14A and 14B, when the portable telephone 230 which the user takes with him or her is connected to the connecter 218*a* of the image forming apparatus 210 and the user instructs the image forming apparatus 210 to receive the publication through the operation section 212 (Step S261), the image forming apparatus 210 displays a message for making the user input the user name as one of accounts and the electronic key on the display section 213.

When the user name and the electronic key are inputted through the operation section 212, the image forming apparatus 210 is connected to the server 250 through the portable telephone 230 (Step S262), and sends the user name and the electronic key inputted and further request to send corresponding provided article data to the server 250 (Step S263).

When receiving the user name, the electronic key and the request to send provided article data from the image forming apparatus 210, the server 250 searches provided article data corresponding to the user name and the electronic key received with reference to the provided article table 2523 (Step S264). Then, the server 250 sends the searched provided article data to the image forming apparatus 210 (Step S265).

When there are not corresponding provided article data, the server 250 informs the image forming apparatus 210 of "there are not corresponding data". When the received electronic key does not agree with an electronic key corresponding to the received user name stored in the provided article table 2523, the server 250 determines that the user is not a legal user, and sends information on "it is impossible to sent provided article data" to the image forming apparatus 210.

When receiving the provided article data, the image forming apparatus 210 determines whether full-color photograph data are included in the received provided article data or not (Step S266), and determines the printing system on the result of the determination.

That is, when determining that full-color photograph data are included in the provided article data (Step S266; YES), the image forming apparatus 210 displays a message for making the user select any one of the electro-photographic system and the inkjet system to print a page including the full-color photograph, so that the user selects any one of the systems through the operation section 212 (Step S267).

When the user selects the electro-photographic system (Step S267; NO), the image forming apparatus 210 determines the printing system so as to print all contents of the provided article data according to the electro-photographic system (Step S269). On the other hand, when the user selects the inkjet system (Step S267; YES), the image forming apparatus 210 determines the printing system so as to print the page including the full-color photograph according to the inkjet system and other pages according to the electro-photographic system (Step S268).

In step S266 when determining that full-color photograph data are not included in the provided article data (Step S266; NO), the image forming apparatus 210 determines the printing system so as to print all contents of the provided article data according to the electro-photographic system (Step S269).

When determining the printing system, the image forming apparatus 210 then calculates about time to print and bind the data on the determined printing system, data amount of the provided article data or the like, and displays the time as time to keep the user waiting on the display section 213 (Step S270).

Then, when the user instructs to start printing and binding through the operation section 212, for example, by pushing a start key (Step S271; YES), the image forming apparatus 210 starts printing and binging based on the provided article data according to the above-determined printing system (Step S272).

That is, the image forming apparatus 210 edits the provided article data in the predetermined printing layout, and prints the edited data according to the print condition of the "inkjet system" or the "electro-photographic system" as determined above. At the time, the image forming apparatus 210 reads out electronic watermark data stored in the storage 217, and performs the image forming based on the read electronic watermark data, when performing the image forming based on the provide article data.

When performing the print processing based on the provide article data, the image forming apparatus 210 performs predetermined post-processing to the printed matter. Therefore, the image forming apparatus 210 binds and ejects the printed matter to the eject tray 2161, and provide one publication form the user. When finishing printing and binding, the image forming apparatus 210 informs the server 250 of the printing and binding completion (Step S273), and finishes the printed matter providing processing.

Figure 15:
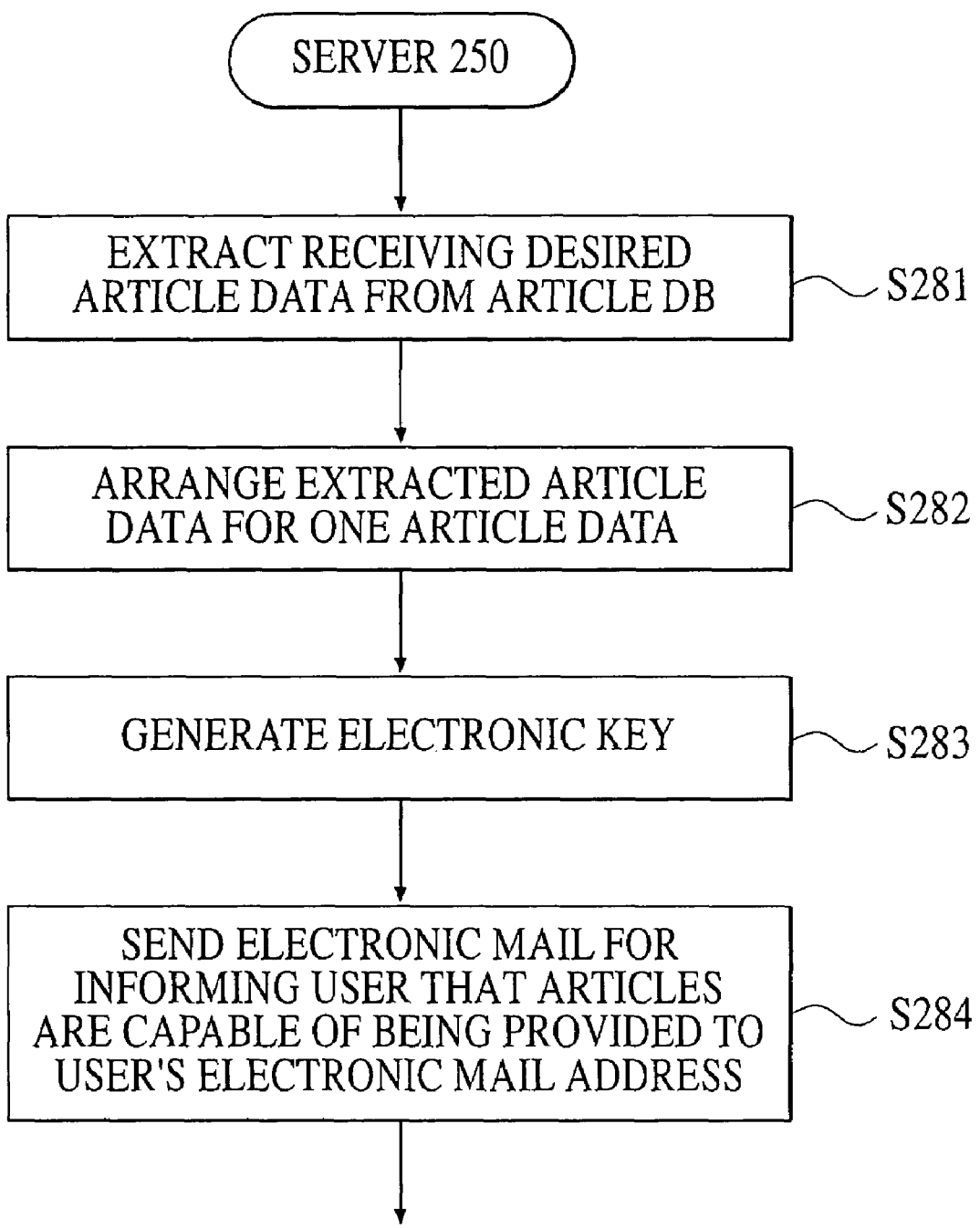
FIG. 15 is a flow chart showing provided article data generating processing performed by the server 250.

FIG. 15 is a flow chart showing provided article data generating processing. The processing is one performed by the server 250 at the predetermined time before the receiving desired date stored in the registered user table 2522 for every user registered in the service center. The processing is performed after all magazines in which the receiving desired articles are appeared are published.

As shown in FIG. 15, the controller 251 of the server 250 extracts corresponding stored article data from the article DB 2521 with reference to the registered user table 2522 (Step S281). Then, the controller 251 arranges the extracted stored article data for one provided article data (Step S282). When generating the electronic key, the controller 251 relates the provided article data to the generated electronic key, and adds them to the provided article data table 2523 (Step S283).

Then, the controller 251 sends the electronic mail for informing the user of that the publication can be received to the electronic mail address of the user. At the time, the controller 251 searches one or a plurality of names of shops at which the image forming apparatuses 210 near to the address of the user are disposed with reference to the image forming apparatus table 2524, and generates the mail including the searched shop names and the generated electronic key (Step S284).

As described above, when the controller 251 generates the electronic data (provided article data) of the publication to be provided for the user and informs the user of that they can be provided, the server 250 finishes the provided article data generating processing.

As described above, the server 250 disposed in the service center manages electronic data (stored article data) of the publications the copyrights of which the publishing companies A, B and C own on the basis of the article DB 2521, extracts stored article data on user's demand from the article DB 2521, and generates provided article data. Then, the image forming apparatus 210 obtains the provided article data corresponding to the inputted user name and electronic key from the server 250, forms images based on the provided article data, prints/binds the formed images and provides the publication fro the user.

Accordingly, when the user selects only desired articles, it is possible to provide an original publication (printed matter) printed and bound on user's demand. That is, the user can select and obtain only the desired articles without restriction of the publishing company.

Because the image forming apparatus 210 comprises two image forming sections of the inkjet-type image forming section 2151 and the electrophotography-type image forming section 2152 as the image forming member, it is possible to determine two systems of the inkjet system for printing high-quality images and the electro-photographic system for printing images at high speed as the printing system. When color photograph data are included in the provide article data, because the inkjet-type image forming section 2151 forms images, it is possible to provide high-quality finished printed matter for the user without lowering the quality of the full-color photograph.

Because image forming apparatus 210 forms images based on electronic watermark data when forming images, it is possible to provide the copyright of the printed matter (publication) to be provided for the user.

Although the present invention has been explained according to the above-described embodiment, it should also be understood that the present invention is not limited to the embodiment and various chanted and modifications may be made to the invention without departing from the gist thereof.

For example, the electronic key may be stored in the portable telephone 230. In the case, when the portable telephone 230 is connected to the image forming apparatus 210, the image forming apparatus 210 may read out the electronic key stored in the portable telephone 230 and send it and the request to send data to the server 250.

The serial article appearing in the magazine published periodically is the object according to the above-described embodiment. For example, a single-appearing article or a publication such as a novel or the like may be the object, and the publication (printed matter) may be provided for the user only one time or at predetermined times.

The server 250 may store the telephone number as one of identification information on the portable telephone 230 related to the provided article data, instead of the user name as one of identification information. In the case, when the image forming apparatus 210 connects to the server 250 through the portable telephone 230 connected to the image forming apparatus 210, the image forming apparatus 210 informs the server 250 of the telephone number of the portable telephone 230. Then, the server 250 sends the provided article data corresponding to the telephone number to the image forming apparatus 210.

The print condition and the post-processing condition when the image forming apparatus 210 forms images based on the provided article data may determined by not the image forming apparatus 210 but the user arbitrarily.

As described above, the server 250 can convert articles appearing in the publication such as, for example, a magazine or the like to electronic data, and store them as the stored article data. Then, the server 250 can extract stored data corresponding to the article desired by the user from the stored article data, relate the stored data to the account and store them as the provided article data. Further, the server 250 can send the electronic mail including the account to the user.

On the other hand, when the user receiving the electronic mail inputs the account included in the electronic mail, the image forming apparatus 210 can request the server 250 to send the provided article data corresponding to the inputted account. Consequently, the image forming apparatus 210 can form images and provide them for the user, for example, as the printed matter on the basis of the provided article data sent from the server 250 according to the request.

Because the server 250 stores the stored article data which are electronic data of publications (articles) obtained by closing the license contract with a plurality of publishing companies, the image forming apparatus 210 can provide original printed matter on use's demand more without the restriction of the publishing companies.

Because the image forming apparatus 210 comprises a plurality of image forming sections for forming images according to different image forming systems, the image forming apparatus 210 can select any image forming section according to the rate of the color photograph data included in the provided article data. That is, for example, the image forming apparatus 210 can select the inkjet system for printing high-quality images in first case the color photograph data are included in the provided article data, or the electrophotography type for printing images at high speed in second case other than the first case. As a result, it is possible to provide the high-quality finished printed matter for the user without lowering the quality of the color photograph.

Third Embodiment

Hereinafter, the third embodiment of the present invention will be explained in detail with reference to figures.

Although the present invention will be explained in case the present invention is applied to an image forming apparatus as a copying machine disposed at a shop such as a convenience store or the like, it is not limited to the case.

Figure 16:
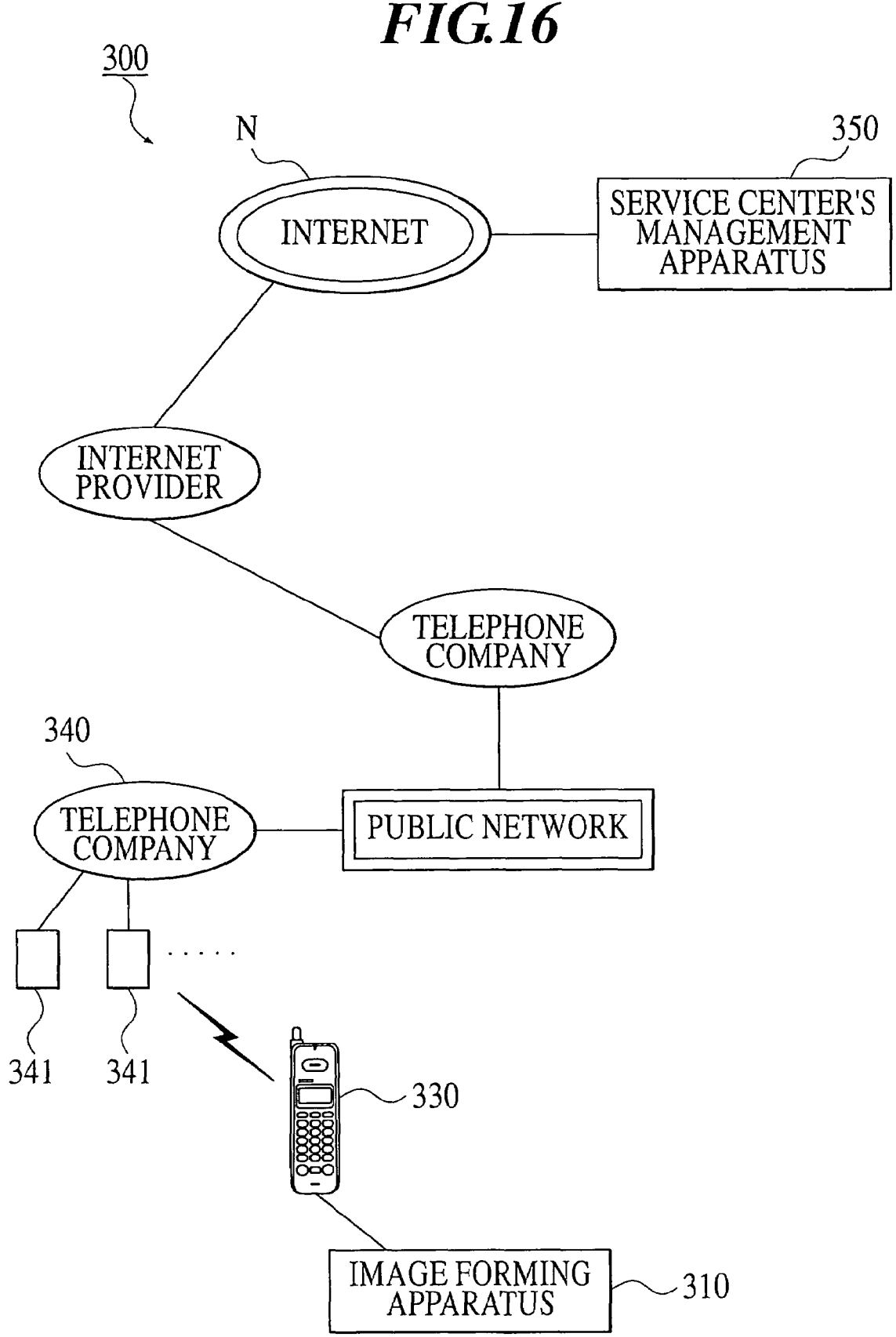
FIG. 16 is a conceptual view showing a whole structure of a service system 300 according to a third embodiment to which the present invention is applied.

FIG. 16 is a schematic view showing a service system 300 according to the third embodiment.

As shown in FIG. 16, the service system 300 mainly comprises an image forming apparatus 310, a portable telephone 330 and a management apparatus 350 disposed in the service center.

The image forming apparatus 310 is a so-called copying machine disposed at a shop such as a convenience store or the like, for forming images according to operation instructions of the user, substantially like the image forming apparatus 110 according to the first embodiment or the image forming apparatus 210 according to the second embodiment. When performing image forming processing, the image forming apparatus 310 communicates data with the management apparatus 350 through the portable telephone 330 connected to the image forming apparatus 310.

Figure 17:
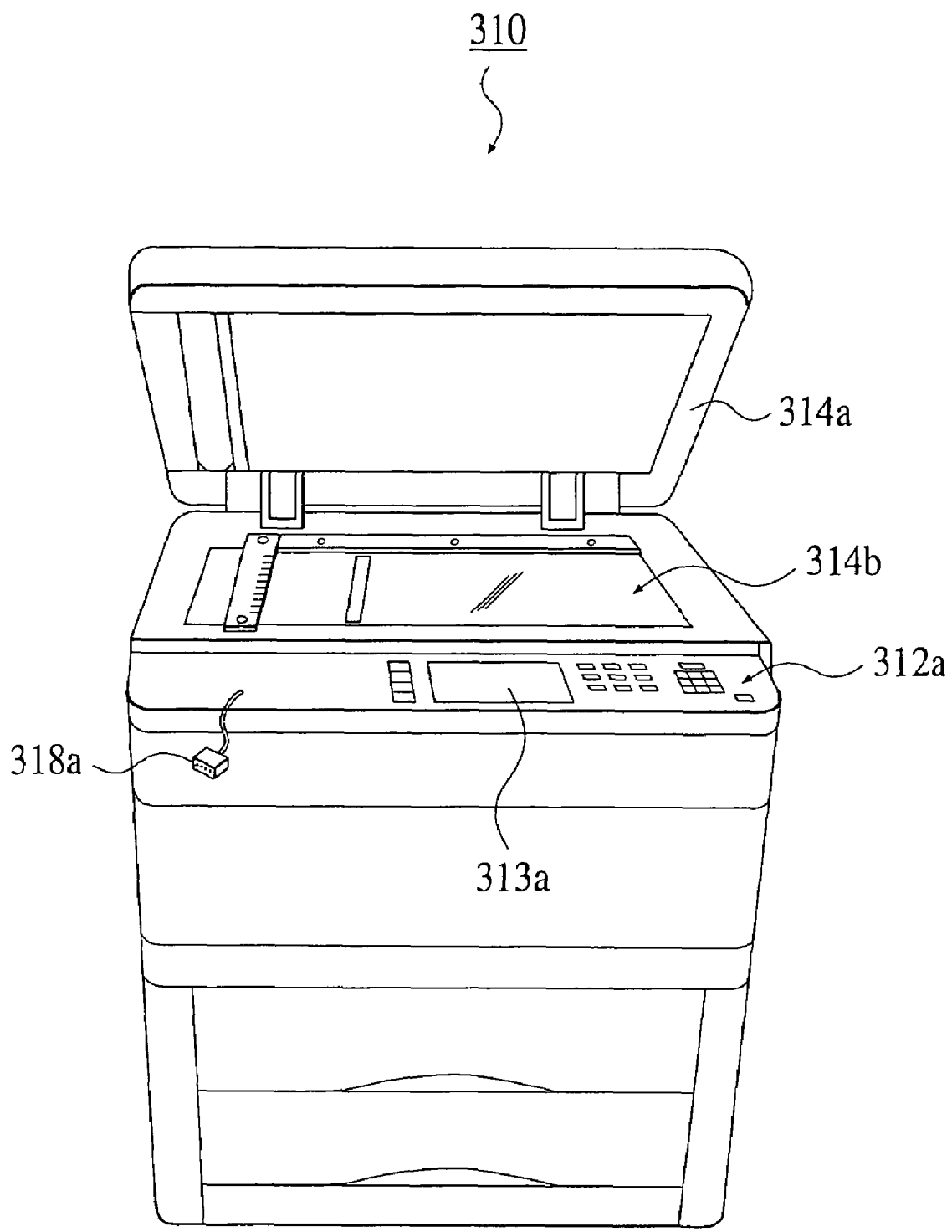
FIG. 17 is an external appearance view of an image forming apparatus 310 of the service system 300 shown in FIG. 16.

FIG. 17 is a perspective view showing an example of an external appearance of the image forming apparatus 310.

As shown in FIG. 17, the image forming apparatus 310 comprises a display panel 313a, an operation panel 312a, a scanner cover 314a, a connecter 318a and a document table 314b on an upper surface thereof. FIG. 17 shows the state the scanner cover 314a is opened.

The user operates the operation panel 312a to input various types of operation instructions with watching the display panel 313a. For example, when the user copies a document, the user places the document on the document table 314b and closes the scanner cover 314a. Then, when the user operates the operation panel 312a with watching the display panel 313a, to determine a print condition, and pushes a start button, the user makes the image forming apparatus 310 start reading and printing the document.

The connecter 318a is used for connected the portable telephone 330 which the user takes with him or her to the image forming apparatus 310. The user connects the connecter 318a to a connecter provided at a lower position of the portable telephone 330 to make the image forming apparatus 310 communicate data with the portable telephone 330.

That is, when the image forming apparatus 310 is connected to the portable telephone 330 through the connecter 318a, the image forming apparatus 310 communicates data with the management apparatus 350 through the portable telephone 330.

As shown in FIG. 16, the portable telephone 330 is realized by a well-known wireless telephone comprising a wireless call function and a wireless data communication function, like the portable telephone 130 according to the first embodiment or the portable telephone 230 according to the second embodiment. The portable telephone 330 performs data communication with the management apparatus 350 through a wireless base station 341 belonging to a telephone company 340 with which the portable telephone 330 makes a contract.

The management apparatus 350 is managed by the service center for providing the service according to the third embodiment, and is realized by a well-known server apparatus. The management apparatus 350 is connected performs data communication with the image forming apparatus 310 through the portable telephone 330 connected to the image forming apparatus 310.

Next, structured of the image forming apparatus 310, the portable telephone 330 and the management apparatus 350 will be explained as follows.

Figure 18:
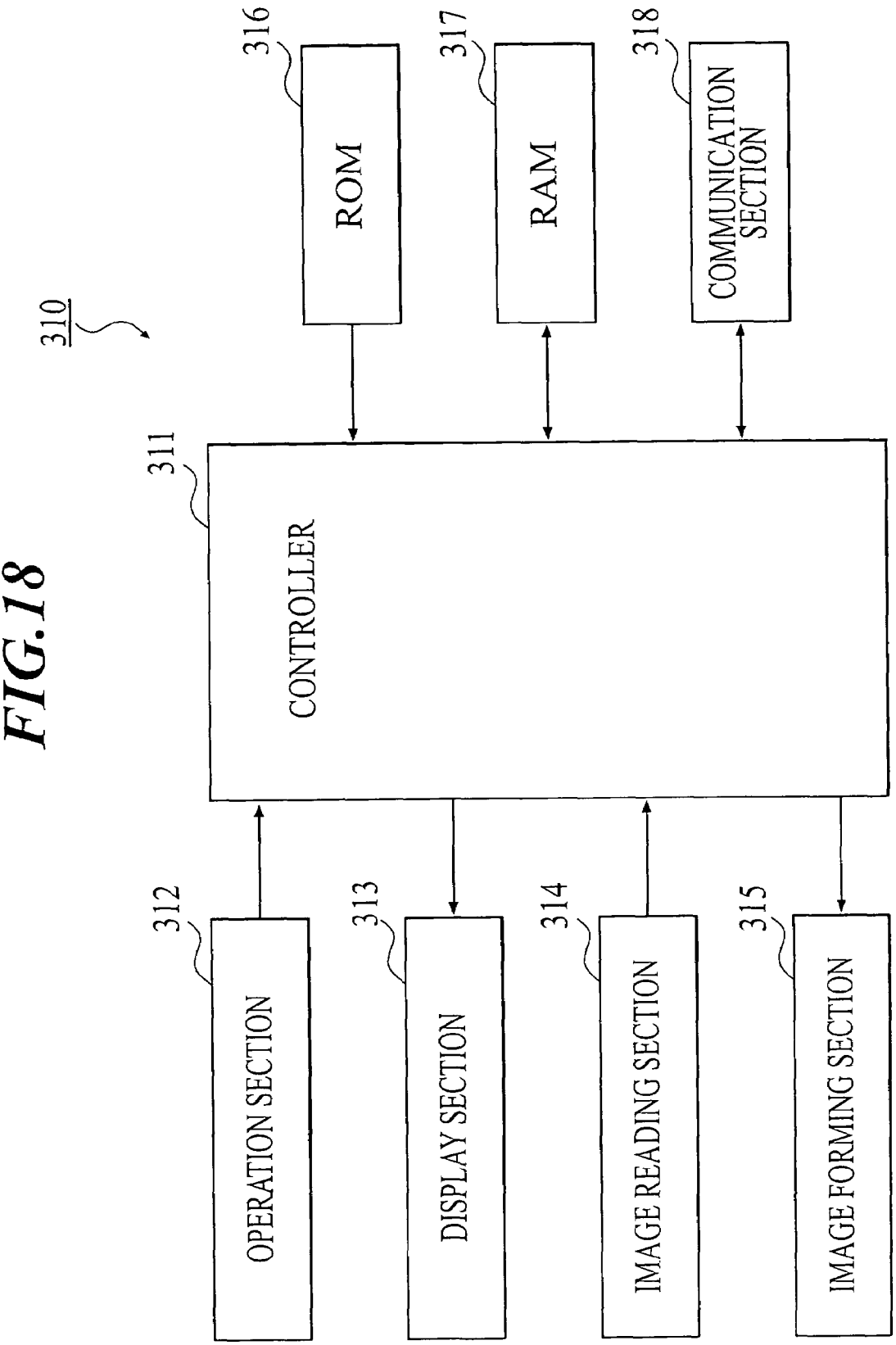
FIG. 18 is a block diagram showing a functional structure of a main part of the image forming apparatus 300 shown in FIG. 17.

FIG. 18 is a block diagram showing a main structure of the image forming apparatus 310.

As shown in FIG. 18, the image forming apparatus 310 comprises a controller 311, an operation section 312, a display section 313, an image reading section 314, an image forming section 315, a ROM 316, a RAM 317 and a communication section 318.

The controller 311 comprises, for example, a CPU, and controls each section for the image forming apparatus 310 in a concentrated way according to various types of control programs stored in the ROM 316. More specifically, when the controller 311 reads out various types of control programs stored in the ROM 316 and stores them in the RAM 317 temporarily according to a signal inputted through the communication section 318 or the operation section 312. Then, the controller 311 performs various processing according to the programs, to make each section function of the image forming apparatus 310 function. At the time, the controller 311 displays results of the processing on the display section 313 or sends them to the management apparatus 350 from the communication section 318 through the portable telephone 330, as necessary.

The operation section 312 is one used by the user for inputting operation instructions, and corresponds to the operation panel 312a comprising various types of operation buttons or the like (for example, numeric keys or a start button) having proper functions respectively, shown in FIG. 7. The operation section 312 outputs a pushed signal of a button pushed by the user on the operation panel 312a, to the controller 311. The operation section 312 may be a touch panel which combines the operation section 312 with the display section 313.

The display section 313 displays, for example, a menu screen for determining a print condition, or the like, according to a display signal outputted from the controller 311. The display section 313 corresponds to the display panel 313a consisting of a LCD, an EL or the like, shown in FIG. 17.

The image reading section 314 reads out, for example, predetermined documents placed on the document table 314b according to a reading signal outputted from the controller 311. The image reading section 314 includes the scanner cover 314a and the document table 314b shown in FIG. 17, and a scanner under the document table 314b. The scanner comprises a light source, a lens, a CCD (Charge Coupled Device) or the like. When the scanner makes the light source irradiate light to the document and scans the document with the light, the scanner reads out the image of the document by gathering and converting the reflection photo-electrically. The image data read by the image reading section 314 are stored in the RAM 317 temporarily. The image includes not only image data of figures or photographs but also text data of characters, marks or the like.

The image forming section 315 comprises a LD (Laser Diode), a photosensitive drum, a toner, a feeder, an eject section of the like. The image forming section 315 carries a printing paper of the size in the direction instructed through the operation section 312 from the feeder according to the control signal outputted from the controller 311, and drives the LD to form a static electric latent image on a surface of the photosensitive drum according to the image signal outputted from the controller 311. Then, the image forming section 315 makes the toner adhere to an area at which the static electric latent image is formed on the surface of the photosensitive drum, transcribes the toner on the printing paper carried from feeder so that the toner is fixed on the printing paper, and ejects the printing paper from the eject section.

The ROM 316 is a read-only semiconductor memory, and stores basic programs performed by the controller 311, processing programs for performing various processing according to the embodiment, data or the like. The processing programs include a program for performing image forming apparatus use processing (as shown in FIGS. 23A and 23B) as follows.

The ROM 316 may be an erasable/writable storage medium such as a flush memory or the like. In the case, the ROM 316 has a structure for obtaining and storing programs or data inputted from an external through the communication section 318 so that the controller 311 performs various processing according to the programs or the data.

The RAM 317 is a storage medium for storing data temporally. A program area in which the programs to be performed by the controller 311 are developed, a data area for storing data inputted through the communication section 318 or the operation section 312, results of various processing performed by the controller 311 or the like, an image data area for storing image data inputted through the image reading section 314 or the communication section 318 or the like is formed in the RAM 317.

The communication section 318 includes the connecter 318a shown in FIG. 17, and is an interface for connecting the image forming apparatus 310 to the portable telephone 330 connected to the connector 318a, so as to transfer data between the image forming apparatus 310 and the portable telephone 330.

Figure 19:
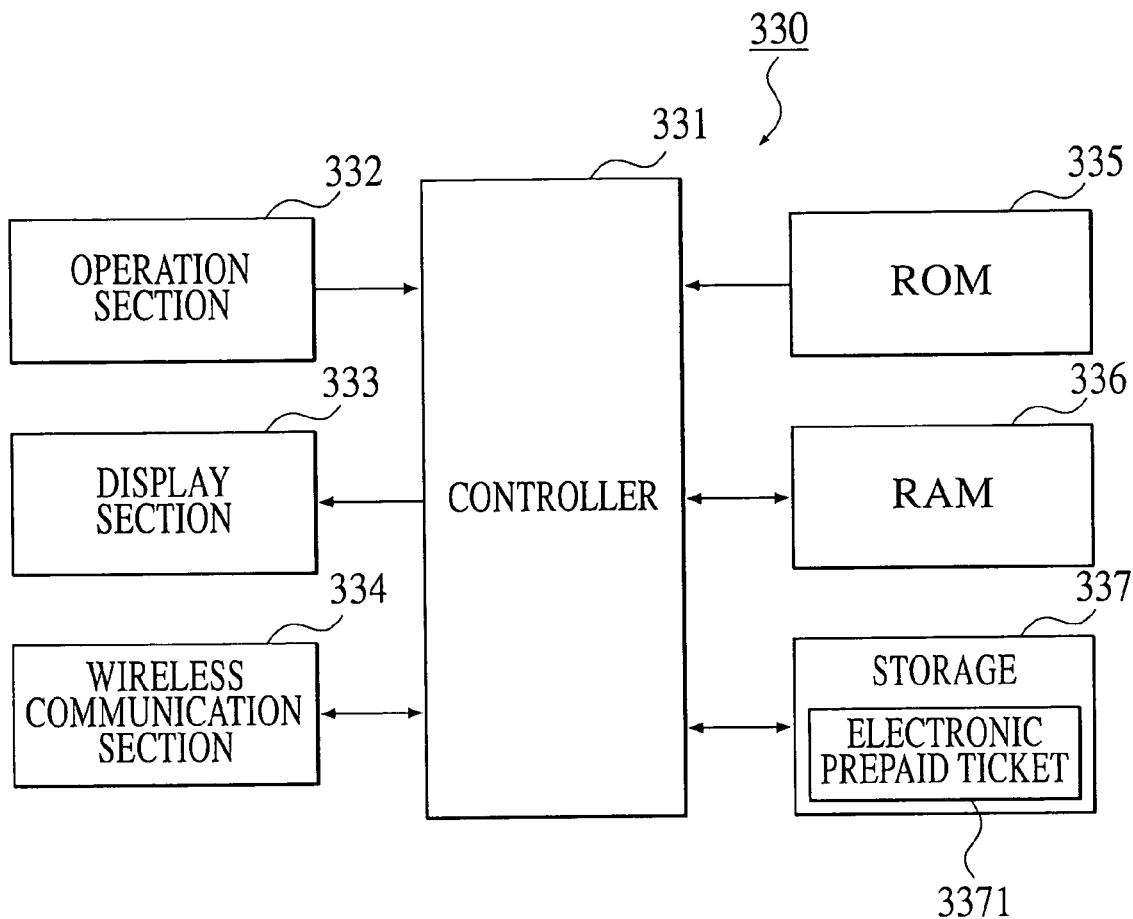
FIG. 19 is a block diagram showing a functional structure of a main part of a portable telephone 330 of the service system 300 shown in FIG. 16.

FIG. 19 is a block diagram showing a main structure of the portable telephone 330.

As shown in FIG. 19, the portable telephone 330 comprises a controller 331, an operation section 332, a display section 333, a wireless communication section 334, a ROM 335, a RAM 336 and a storage 337.

The controller 331 controls each section for the portable telephone 330 in a concentrated way. When the controller 331 performs various processing according to various types of control programs read out of the ROM 335, the controller 331 stores results of the processing in predetermined areas of the storage 337, and displays them on the display section 333.

The operation section 332 comprises various types of function keys such as numeric keys, operation keys or the like, a power supply switch or the like. When detecting that a key or switch is pushed, the operation section 332 outputs a pushed signal of the pushed key or switch to the controller 311.

The display section 333 is composed of a small-size liquid crystal display (LCD) or the like, and displays a screen according to display data outputted from the controller 331.

The wireless communication section 334 is connected to a wireless base station 341 so as to realize various types of information communication with the management apparatus 350. The wireless communication section 334 comprises a wireless antenna, a modulation and demodulation circuit, an encoding/decoding circuit, an amplifier circuit or the like.

Figure 24:
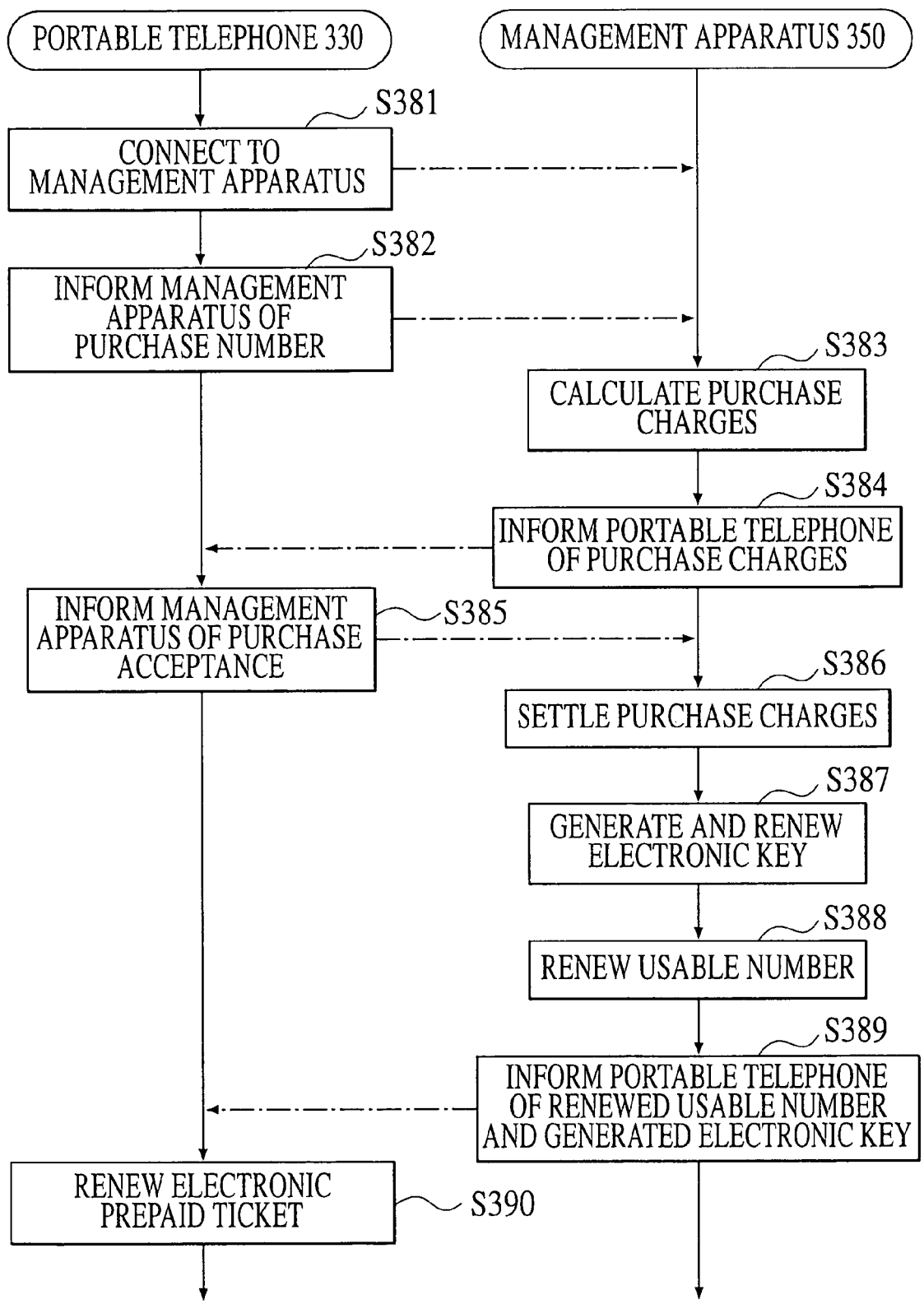
FIG. 24 is a flow chart showing electronic prepaid ticket purchase processing performed by the portable telephone 330 and the management apparatus 350.

The ROM 335 is composed of a nonvolatile semiconductor memory such as a flush memory or the like, and stores basic programs performed by the portable telephone 330, processing programs for performing various processing according to the third embodiment, data or the like. The processing programs include programs for performing image forming apparatus use processing (as shown in FIGS. 23A and 23B) and electronic prepaid ticket purchase processing (as shown in FIG. 24) as follows.

The ROM 335 may be an erasable/writable storage medium such as a flush memory or the like. In the case, the ROM 335 has a structure for obtaining and storing programs or data inputted from an external through the wireless communication section 334 so that the controller 331 performs various processing according to the programs or the data.

The RAM 336 is used as a work area for storing programs or data obtained through the ROM 335, the wireless communication section 334 or the operation section 332 or processed data or the like temporally according to various processing performed by the controller 331.

The storage 337 is composed of a magnetic storage medium, an optical storage medium, a nonvolatile memory such as a semiconductor or the like, and can be read/written under control of the controller 331. The storage 337 stores an electronic prepaid ticket 3317.

Figure 20:
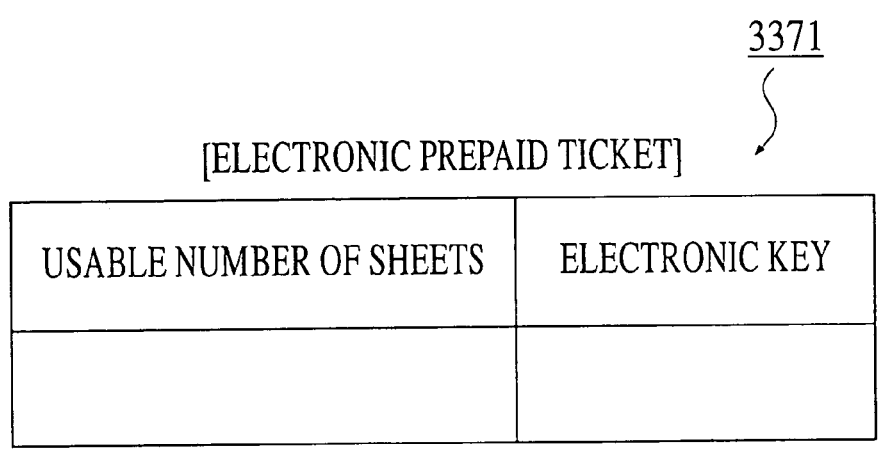
FIG. 20 is a table showing an example of a data structure of an electronic prepaid ticket 3371 of the portable telephone 330.

FIG. 20 is a table showing an example of a data structure of the electronic prepaid ticket 3371.

As shown in FIG. 20, the electronic prepaid ticket 3371 includes the usable number of sheets as electronic prepaid information, and information on the electronic key as identification information.

The usable number of sheets is the number of sheets on which the image forming apparatus 310 can form images when the portable telephone 330 is connected to the image forming apparatus 310. That is, the number of sheets on which the images have been formed is reduced from the usable number of sheets even when the image forming apparatus 310 is used. Further, the purchase number of sheets is added to the usable number of sheets when the electronic prepaid ticket is bought.

The electronic key is information for identifying the user when the user uses the image forming apparatus 310, and includes user ID information and purchase date and time information published by the management apparatus automatically when the use buys the electronic prepaid ticket. In order to prevent the information from being misused, when the user buys the electronic prepaid ticket additional or uses the image forming apparatus 310, one part (for example, the date, the time or the like) of the information included in the electronic key is renewed.

Figures 21, 22:
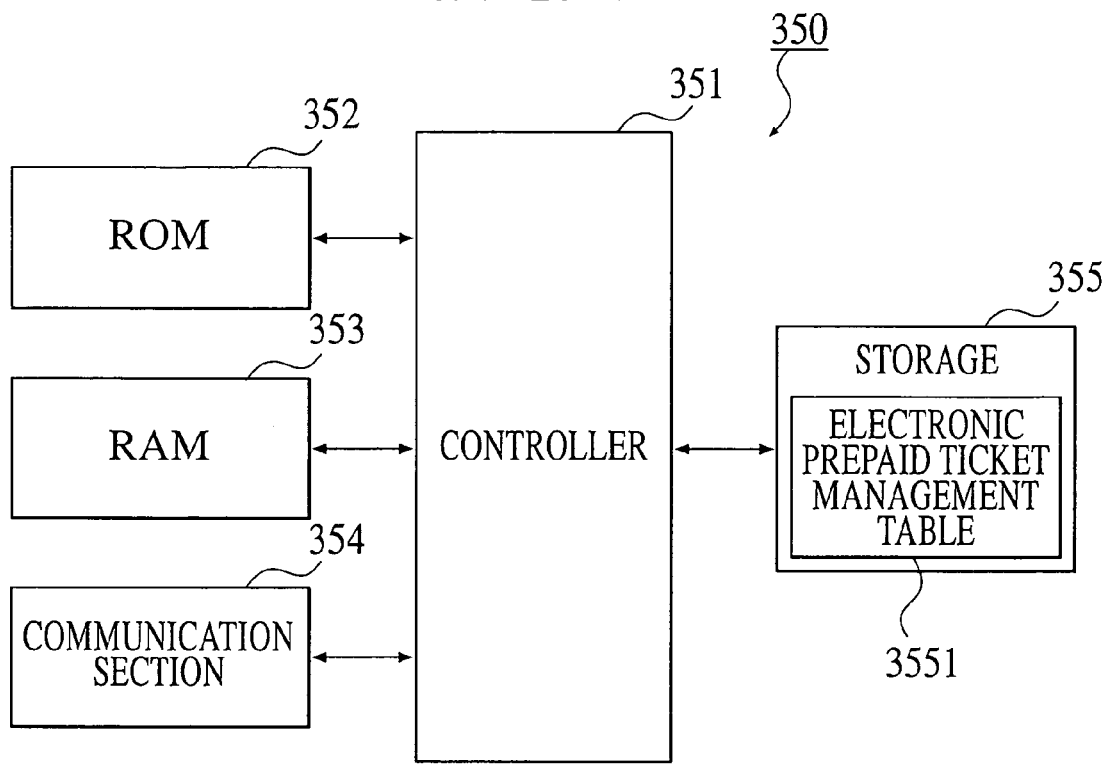
FIG. 21 is a block diagram showing a functional structure of a main part of a management apparatus 350 of the service system 300 shown in FIG. 16.
FIG. 22 is a table showing an example of a data structure of an electronic prepaid ticket management table 3551 of the management apparatus 350.

FIG. 21 is a block diagram showing a main structure of the management apparatus 350.

As shown in FIG. 21, the management apparatus 350 comprises a controller 351, a ROM 352, a RAM 353, a communication section 354 and a storage 355.

The controller 351 comprises, for example, a CPU, and controls the management apparatus 350 in a concentrated way according to various types of control programs stored in the storage 355.

The ROM 352 is a read-only semiconductor memory, and stores basic programs performed by the controller 351, processing programs for performing various processing according to the third embodiment, data or the like. The processing programs include programs for performing image forming apparatus use processing (shown in FIGS. 23A and 23B) and electronic prepaid ticket purchase processing (shown in FIG. 24) as follows.

The ROM 352 may be an erasable/writable storage medium such as a flush memory or the like. In the case, the ROM 352 has a structure for obtaining and storing programs or data inputted from an external from the communication section 354, so that the controller 351 performs various processing according to the obtained program or data.

The RAM 353 is used as a work area for storing programs or data obtained from the ROM 352 or through the communication section 354, processed data or the like according to various processing performed by the controller 351 temporarily.

The communication section 354 is an interface for communicating data with another apparatus (mainly, the portable telephone 330 or the telephone company) through the Internet. The communication section 354 is realized by, for example, a router or the like.

The storage 355 comprises, for example, a HDD, and stores basic programs performed by the controller 351, processing programs or processing data for performing various types of processing according to the third embodiment, or the like. The processing programs include programs for performing image forming apparatus use processing (shown in FIGS. 23A and 23B) and electro prepaid ticket purchase processing (shown in FIG. 24) as follows, and the processing data include an electronic prepaid ticket management table 3551.

FIG. 22 is a table showing an example of a data structure of the electronic prepaid ticket management table 3551. The electronic prepaid ticket management table 3551 is a table for managing information on the electronic prepaid ticket for every portable telephone 330.

That is, as shown in FIG. 22, the electronic prepaid ticket management table 3551 stores the electronic prepaid ticket related to the portable telephone number for every portable telephone number of the portable telephone 330. The electronic prepaid ticket includes information on the usable number of sheets and the electronic key.

In the electronic prepaid ticket, the number of used sheets is reduced from the usable number of sheets and the electronic key is renewed even when the image forming apparatus 310 is used. Further, the number of purchase sheets is added to the usable number of sheets and the electronic key is renewed even when the electronic prepaid ticket is bought by the portable telephone 330.

Next, the processing according to the present embodiment will be explained.

First, the processing when using the image forming apparatus (image forming apparatus use processing) will be explained.

FIGS. 23A and 23B are flowcharts showing the image forming apparatus use processing.

As shown in FIGS. 23A and 23B, when the portable telephone 330 which the user takes with him or her is connected to the connector 318a of the image forming apparatus 310 (Step S361), the portable telephone 330 connects to the management apparatus 350 and sends the electronic key included in the electronic prepaid ticket 3371 to the management apparatus 350 (Step S362). Herein, when connecting to the management apparatus 350, the portable telephone 330 sends the own potable telephone number to the management apparatus 350.

On the other hand, when receiving the portable telephone number sent from the portable telephone 330, the management apparatus 350 reads out the electronic prepaid ticket related to the received portable telephone number with reference to the electronic prepaid ticket management table 3351. Then, the management apparatus 350 compares the electronic key included in the read electronic prepaid ticket with the received electronic key to determine agreement (Step S363).

As a result of the agreement, when both electronic keys agree with each other (Step S364; YES), the management apparatus 350 refers to the usable number of sheets included in the read electronic prepaid ticket, to determine whether the image forming apparatus 310 can be used or not. That is, when the usable number of sheets is one or more, the management apparatus 350 determines that the image forming apparatus 310 can be used. On the other hand, when the usable number of sheets is not less than one, the management apparatus 350 determines that the image forming apparatus 310 can not be used (Step S366).

On the other hand, when both electronic keys do not agree with one other or the electronic prepaid ticket corresponding to the received portable telephone number is not stored in the electronic prepaid ticket management table 3551 (Step S364; NO), the management apparatus 350 determines that the image forming apparatus 310 can not be used (Step S366).

When determining whether the image forming apparatus 310 can be used or not, the management apparatus 350 sends the use determination result to the portable telephone 330. At the time, when the use determination result is that the image forming apparatus 310 can be used, the management apparatus 350 sends the usable number of sheets to the portable telephone 330 (Step S367).

On the other hand, when receiving the use determination result sent from the management apparatus 350, the portable telephone 330 forwards the use determination result to the image forming apparatus 310 (Step S368). Then, when receiving the use determination result forwarded from the portable telephone 330, the image forming apparatus 310 performs the following processing according to the use determination result.

That is, when the use determination result indicates that the image forming apparatus 310 is unusable (Step S369; NO), the image forming apparatus 310 displays the massage for showing that the image forming apparatus 310 is unusable on the display section 313 (Step S370). Then, the image forming apparatus use processing is finished.

On the other hand, when the use determination result indicates that the image forming apparatus 310 is usable (Step S369; YES), the image forming apparatus 310 displays the message for showing that the image forming apparatus 310 is usable and the received usable number of sheets on the display section 313, to make the user determine the number of desired printing sheets, the condition or the like.

Then, when the number of desired printing sheets, the print condition or the like is determined by the user through the operation section 312 (Step S371), the image forming apparatus 310 compares the determined number of printing sheets with the usable number of sheets forwarded from the portable telephone 330 (Step S372).

As a result of the comparison, when the determined number of sheets is within the usable number of sheets (Step S372; YES), the image forming apparatus 310 starts performing the image forming processing according to the determine number of sheets in the determined print condition (Step S373).

On the other hand, when the determined number of sheets exceeds the usable number of sheets (Step S372; NO), the image forming apparatus 310 displays the message for showing that the determined number exceeds the usable number on the display section 313 to make the user re-determine the print condition such as the number of printing sheets or the like, or pay excess use charges (coin) (Step S374).

When the print condition such as the number of printing sheets is determined again, the image forming apparatus 310 returns to Step S372 to compare the re-determined number of sheets with the usable number of sheets. When the use charges (coin) are paid, the usable number of sheets is renewed to the value to which the number of sheets corresponding to the paid use charges (coin) is added. Then, the image forming apparatus 310 returns to Step S372 to compare the determined number with the renewed usable number.

Herein, in order to pay the excess use charges, the use may buy the electronic prepaid ticket additionally. That is, the portable telephone 330 and the management apparatus 350 perform the following electronic prepaid ticket purchase processing (shown in FIGS. 25A and 25B) to make the user buy the electronic prepaid ticket additional. Then, the image forming apparatus 310 compares the renewed usable number of sheets informed from the management apparatus 350.

Then, when the image forming apparatus 310 completes performing the image forming processing (Step S373), the image forming apparatus 310 informs the portable telephone 330 of the number of printed sheets (number of used sheets) (Step S375).

Then, the portable telephone 330 renews the electronic prepaid ticket 3371 according to the number of used sheets informed from the image forming apparatus 310. That is, the portable telephone 330 reduces the informed number of used sheets from the present usable number of sheets, and stores the result of reduction as the renewed usable number of sheets (Step S376). Further, the portable telephone 330 sends the informed number of used sheets to the management apparatus 350 (Step S377).

When receiving the number of used sheets from the portable telephone 330, the management apparatus 350 renews the electronic prepaid ticket management table 3551 according to the number of used sheets. That is, the management apparatus 350 renews information on the corresponding electronic prepaid ticket. More specifically, the management apparatus 350 reduces the informed number of used sheets from the usable number of sheets corresponding to the portable telephone 330, and stores the result of the reduction as the renewed usable number of sheets (Step S378). Then, the management apparatus 350 generates the electronic key corresponding to the usable number of sheets, and stores the generated electronic key as the renewed electronic key (Step S379).

Then, the management apparatus 350 sends the generated electronic key to the portable telephone 330 (Step S380). When the new electronic key is informed from the management apparatus 350, the portable telephone 330, the portable telephone 330 renews the electronic key in the electronic prepaid ticket 3371 stored to the informed electronic key (Step S381).

When the above-described steps are performed, the image forming apparatus is finished.

Next, the processing when buying the electronic prepaid ticket (electronic prepaid ticket purchase processing) will be explained.

FIG. 24 is a flowchart showing the electronic prepaid ticket purchase processing.

As shown in FIG. 24, the portable telephone 330 accesses to the Web site on the Internet provided from the management apparatus 350 according to the operation inputted by the user, for example, when any key of the operation section 332 is pushed by the user, and displays the Web page for the electronic prepaid ticket purchase on the display section 333 (Step S381).

Then, when the user inputs the purchase-desired number of sheets of the electronic prepaid ticket on the Web page through the operation section 332, the portable telephone 330 sends the inputted purchase-desired number of sheets with the portable telephone number to the management apparatus 350 (Step S382).

The management apparatus 350 calculates purchase charges by multiplying the purchase-desired number of sheets received from the portable telephone 330 by the image forming cost (Step S383). Then, the management apparatus 350 informs the portable telephone 330 of the calculated purchase charges to obtain purchase acceptance (Step S384).

When the portable telephone 330 informs the management apparatus 350 of the purchase acceptance (Step 385), the management apparatus 350 settles the purchase charges (Step S386). The method for settling the purchase charges may be any one such as (1) a method for collecting the purchase charges with the call charges of the portable telephone 330 later, (2) a method for settling the purchase charges in a credit card on the same day, or the like.

When completing to settle the purchase charges, the management apparatus 350 generates the electronic key for the purchase (Step S387), and renews the electronic prepaid ticket corresponding to the portable telephone number of the portable telephone 330. That is, the management apparatus 350 renews the usable number of sheets to the value to which the purchase number of sheets is added, and renews the electronic key to the generated electronic key (Step S388).

The management apparatus 350 informs the portable telephone 330 of the renewed usable number of sheets and the generated electronic key (Step S389). Then, when receiving the renewed usable number of sheets and the generated electronic key from the management apparatus 350, the portable telephone 330 renews information on the stores electronic prepaid ticket 2271 based on to the informed values (Step S390).

When the above-described steps are performed, the electronic prepaid ticket purchase processing is finished.

When the portable telephone 330 does not accept the purchase in Step S385, the management apparatus 350 informs the portable telephone 330 of the cancel of the purchase and finishes the processing.

Although the present invention has been explained according to the above-described third embodiment, it should also be understood that the present invention is not limited to the embodiment and various chanted and modifications may be made to the invention without departing from the gist thereof. For example, the determination whether the image forming apparatus 310 can be used or not in Step S366 in FIG. 23A may be performed by the portable telephone 330 or the image forming apparatus 310.

Further, the electronic prepaid ticket may include the usable balance instead of the usable number of sheets. When the user uses the image forming apparatus 310, the use charges are calculated by multiplying the number of used sheets by the image forming cost, and reduced from the usable balance.

The service system 300 may have a structure capable of using the image forming apparatus 310 without using the portable telephone 330. In the case, the image forming apparatus 310 is connected to a communication line or the like so as to communicate with the management apparatus 350.

Figure 25A:
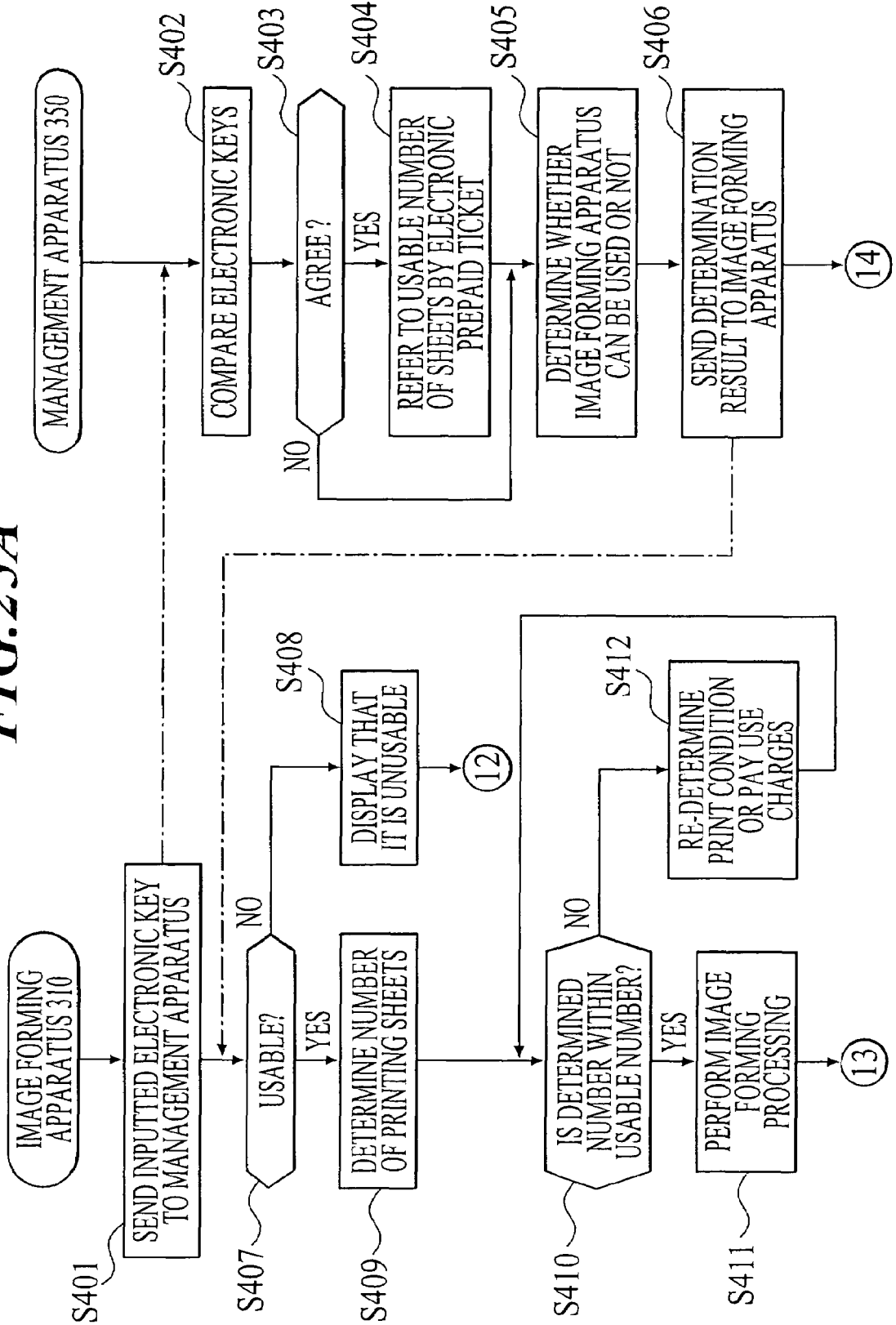

FIGS. 25A and 25B are flowcharts showing the image forming apparatus use processing performed by the image forming apparatus 310 and the management apparatus 350 according to another embodiment of the third embodiment.

As shown in FIGS. 25A and 25B, the image forming apparatus 310 sends the electronic key inputted by the user through the operation section 312 of the image forming apparatus 310 to the management apparatus 350 (Step S401).

When receiving the electronic key sent from the image forming apparatus 310, the management apparatus 350 performs the same processing as Steps S363 to 366 in FIG. 23A to determine whether the image forming apparatus can be used or not (Steps S402 to 405). Then, the management apparatus 350 sends the use determination result to the image forming apparatus 310 (Step S406).

When receiving the use determination result from the management apparatus 350, the image forming apparatus 310 performs the same processing as Steps S369 to 374 in FIG. 23A to perform the image forming processing (Steps S407 to 412). Then, when completing performing the image forming processing, the image forming apparatus 310 informs the management apparatus 350 of the number of printed sheets (number of used sheets) (Step S413).

When receiving the number of used sheets from the image forming apparatus 310, the management apparatus 350 performs the same processing as Steps S378 and 379 in FIG. 23B and renews the electronic key to renew the electronic prepaid ticket management table 3551 according to the number of used sheets (Steps S414 and 415). Then, the management apparatus 350 sends the generated electronic key to the image forming apparatus 310 (Step S416). When receiving the new electronic key sent from the management apparatus 350, the image forming apparatus 310 displays the electronic key on the display section 313 to inform the user of it (Step S417).

When the above-described processing is performed, the image forming apparatus use processing is finished.

As described above, it is possible to get rid of trouble with collection of use charges in the image forming apparatus 310 for providing the service for the general user and making profit.

The service systems according to the first, second and third embodiments have been explained individually. A service system to which three embodiments are applied, or a service system to which a combination of any two embodiments is applied may be realized and provide the above-described services for the user. Specifically, an electric communication business establishment for providing electric communication service, more specifically, a telephone company or a most suitable business establishment to a business using equipment assets held on an internet provider for providing connection service with the Internet is an example of a business establishment for providing the services. Of course, the business establishment and a company for manufacturing and selling the image forming apparatus or a maintenance establishment of the image forming apparatus provide the services in cooperation.

The entire disclosures of Japanese Patent Application Nos. Tokugan 2002-212327 filed on Jul. 22, 2002, 2002-231098 filed on Aug. 8, 2002, and 2002-235606 filed on Aug. 13, 2002 including specifications, claims, drawings and summaries are incorporated herein by reference in their entirety.

What is claimed is:

1. An image forming apparatus which is configured as one device and capable of being connected to a portable communication terminal carryable by a user, comprising:

a reading section for installing a storage medium to store data, the reading section being provided in the device;

an image forming section for forming and printing an image based on the data, the image forming section being provided in the device;

a connector to which the portable communication terminal is connected;

a communication control section for controlling the portable communication terminal connected to the connector, and communicating with a server for managing data of various information on a network;

an obtaining section for obtaining first data and second data desired by the user from the server; the second data being related information of the first data;

a first selecting section for selecting a first output state to store the first data in the storage medium which is installed in the reading section, or a second output state to print the second data in a predetermined print condition predetermined in the device, the first data and the second data being obtained by the obtaining section; and a control section for storing the first data in the storage medium which is installed in the reading section, and for printing the second data by the image forming section in the predetermined print condition predetermined in the device, based on the output state selected by the first selecting section; and a calculating section for calculating a charge for provision of the first data and the second data, wherein the communication control section informs the server of the charge calculated by the calculating section by controlling the portable communication terminal; and wherein the device provides the user with the first data and printed matter of the second data.

2. The apparatus of claim 1, further comprising a post-processing section for performing post-processing to printed matter obtained by forming and printing the image based on the second data by the image forming section.

3. The apparatus of claim 1, wherein the image forming section comprises a first image forming section and a second image forming section for forming images in different ways, and the apparatus further comprises a second selecting section for selecting any one of the first image forming section and the second image forming section as the image forming section for forming and printing the image based on the second data.

4. The apparatus of claim 3, wherein the first image forming section forms the image according to at least an inkjet system, and the second image forming section forms the image according to at least an electro-photographic system.

5. The apparatus of claim 1, further comprising a third selecting section for selecting any one storage medium from an optical storage medium, a magnetic storage medium, an optical magnetic storage and a semiconductor storage medium as the storage medium in which at least one of the first data and the second data are stored by the storing section.

6. The apparatus of claim 1, wherein the first data include music data, and the second data include related information data comprising at least one of text data and image data, concerning the music data.

7. The apparatus of claim 1, wherein the storing section attaches electronic watermark data to at least one of the first data and the second data to be stored in the storage medium, when storing the at least one of the first data and the second data in the storage medium.

8. The image forming apparatus of claim 1, further comprising an editing section for editing the second data based on a printing layout which is included in the print condition, wherein the editing section prohibits the second data from being edited when copyrighted matter is included in the second data.

9. An image forming apparatus which is configured as one device and capable of being connected to a portable communication terminal carryable by a user, comprising:

a reading section for installing a storage medium to store data, the reading section being provided in the device;

an image forming section for forming and printing an image based on the data, the image forming section being provided in the device;

a connector to which the portable communication terminal is connected;

a communication control section for controlling the portable communication terminal connected to the connector, and communicating with a server for managing data of various information on a network;

an obtaining section for obtaining first data and second data desired by the user from the server; the second data being related information of the first data;

a first selecting section for selecting a first output state to store the first data in the storage medium which is installed in the reading section, or a second output state to print the second data in a print condition determined by the user, the first data and the second data being obtained by the obtaining section; and a control section for storing the first data in the storage medium which is installed in the reading section, and for printing the second data by the image forming section in the print condition determined by the user, based on the output state selected by the first selecting section; and a calculating section for calculating a charge for provision of the first data and the second data, wherein the communication control section informs the server of the charge calculated by the calculating section by controlling the portable communication terminal; and wherein the device provides the user with the first data and printed matter of the second data.

10. The apparatus of claim 9, further comprising a post-processing section for performing post-processing to printed matter obtained by forming and printing the image based on the second data by the image forming section.

11. The apparatus of claim 9, wherein the image forming section comprises a first image forming section and a second image forming section for forming images in different ways, and the apparatus further comprises a second selecting section for selecting any one of the first image forming section and the second image forming section as the image forming section for forming and printing the image based on the second data.

12. The apparatus of claim 11, wherein the first image forming section forms the image according to at least an inkjet system, and the second image forming section forms the image according to at least an electro-photographic system.

13. The apparatus of claim 9, further comprising a third selecting section for selecting any one storage medium from an optical storage medium, a magnetic storage medium, an optical magnetic storage and a semiconductor storage medium as the storage medium in which at least one of the first data and the second data are stored by the storing section.

14. The apparatus of claim 9, wherein the first data include music data, and the second data include related information data comprising at least one of text data and image data, concerning the music data.

15. The apparatus of claim 9, wherein the storing section attaches electronic watermark data to at least one of the first data and the second data to be stored in the storage medium, when storing the at least one of the first data and the second data in the storage medium.

16. The image forming apparatus of claim 9, further comprising an editing section for editing the second data based on a printing layout which is included in the print condition, wherein the editing section prohibits the second data from being edited when copyrighted matter is included in the second data.

17. An image forming system comprising a server and an image forming apparatus for communicating with the server through a portable communication terminal, the server comprising:

an article database for storing electronic data of a plurality of articles;

a storage for storing a receiving desired date, an information destination, and an extract condition, in a state of each of the receiving desired date, the informing destination, and the extract condition being corresponding to each user, and for storing a plurality of pieces provided article data, in a state where each of the plurality of pieces of provided article data corresponds to an electronic key; and a control section for extracting the provided article data from the article database based on the extract condition before the receiving desired data, for generating the electronic key, and for storing the extracted provided article data in the storage so that each piece of the extracted provided article data corresponds to the electronic key;

an informing section for sending an electronic mail including the electronic key to the informing destination of the user; and a sending section for sending provided article data corresponding to the electronic key included in sending request information sent from the image forming apparatus through the portable communication terminal to the image forming apparatus, in reply to the sending request information, the image forming apparatus comprising:

a connector to which the portable communication terminal is connected;

a communication section for controlling the portable communication terminal connected to the connector, and communicating with the server;

an input section for inputting the electronic key;

a sending request section for sending the sending request information including the electronic key inputted by the input section to the server through the communication section;

a receiving section for receiving the provided article data sent from the server through the communication section;

an image forming section for forming an image based on the provided article data received by the receiving section; and a calculating section for calculating a charge for provision of the first data and the second data, wherein the communication control section informs the server of the charge calculated by the calculating section by controlling the portable communication terminal.

18. The system of claim 17, wherein the image forming section of the image forming apparatus comprises a plurality of image forming sections for forming images in different ways, and the apparatus further comprises a selecting section for selecting an image forming section for forming the image based on the provided article data from the plurality of image forming sections according to a rate of full-color photograph data included in the provided article data received by the receiving section.

19. The system of claim 17, wherein the server further comprises:

a second storage section for classifying and storing a plurality of stored article data in a predetermined classified condition therein;

a determination section for determining an extract condition for every account stored in the first storage section; and a storage control section for extracting stored article data satisfying the extract condition determined by the determination section, from the plurality of stored article data stored in the second storage section.

20. The system of claim 19, wherein the first storage section of the server stores an electronic mail address related to each of the accounts therein, and the server further comprises a sending section for reading the electronic mail address corresponding to the account out of the first storage section when the storage control section completes extracting and storing the stored article data based on the account, and sending a predetermined electronic mail to the electronic mail address read.

21. The system of claim 17, wherein the account includes at least one of authentication information and identification information of the portable communication terminal.

22. The system of claim 17, the image forming section of the image forming apparatus forms an electronic watermark image when forming the image based on the provided article data.

23. The system of claim 17, the image forming apparatus further comprises a post-processing section for performing post-processing to printed matter of the image formed by the image forming section.

24. The system of claim 23, wherein the post-processing section performs at least one of punch processing for punching a binding hole at a predetermined position of the printed matter, stapling processing for stapling the printed matter, trimmer processing for trimming the printed matter in predetermined size, pamphlet preparing processing for preparing a pamphlet, and biding processing for biding the printed matter simply, as the post-processing.

* * * * *